(12) United States Patent
Matsuura

(10) Patent No.: US 9,479,359 B2
(45) Date of Patent: Oct. 25, 2016

(54) COMMUNICATION DEVICE AND PATH ESTABLISHING METHOD

(75) Inventor: Masahiko Matsuura, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 652 days.

(21) Appl. No.: 13/599,449

(22) Filed: Aug. 30, 2012

(65) Prior Publication Data

US 2013/0077478 A1   Mar. 28, 2013

(30) Foreign Application Priority Data

Sep. 22, 2011  (JP) .................................. 2011-206740

(51) Int. Cl.
*H04L 12/64* (2006.01)
*H04L 12/703* (2013.01)
*H04L 12/707* (2013.01)

(52) U.S. Cl.
CPC ............ *H04L 12/6418* (2013.01); *H04L 45/22* (2013.01); *H04L 45/28* (2013.01); *H04L 45/24* (2013.01)

(58) Field of Classification Search
CPC ....... H04L 45/22; H04L 45/28; H04L 45/00; H04L 45/50; H04L 43/0852; H04L 43/0829; H04L 41/0654; H04L 45/24; H04L 45/304
USPC ....... 370/252, 389, 216, 225, 221, 228, 217, 370/242, 256, 248; 709/239
See application file for complete search history.

(56) References Cited

U.S. PATENT DOCUMENTS

| 7,012,919 | B1 * | 3/2006 | So | H04L 41/5019 370/235 |
|---|---|---|---|---|
| 2002/0156899 | A1 | 10/2002 | Sekiguchi | |
| 2005/0010849 | A1 * | 1/2005 | Ryle | H04J 3/1617 714/758 |
| 2008/0225714 | A1 * | 9/2008 | Denis | 370/232 |
| 2009/0135839 | A1 * | 5/2009 | Khasnabish | 370/401 |
| 2011/0141891 | A1 * | 6/2011 | So | 370/235 |

FOREIGN PATENT DOCUMENTS

| JP | 2002-157053 | 5/2002 |
|---|---|---|
| JP | 2002-319956 | 10/2002 |
| JP | 2010-34792 | 2/2010 |

OTHER PUBLICATIONS

RFC3473, GMPLS signaling RSVP-TE extensions, Jan. 2003.*
RFC5817, Graceful Shutdown in MPLS and Generalized MPLS, Apr. 2010.*
RFC5710, PathErr Message Triggered MPLS and GMPLS LSP Reroutes, Jan. 2010.*

* cited by examiner

*Primary Examiner* — Un C Cho
*Assistant Examiner* — Oussama Roudani
(74) *Attorney, Agent, or Firm* — Staas & Halsey LLP

(57) ABSTRACT

A communication device configured to establish a path for data transmission including a setting circuit configured to receive a request for setting a path, and in the case that the path includes a section where power supply has been turned off so as to suppress data transmission, to set a detour path for bypassing the section using detour routing information corresponding to the section; and a power supply driving circuit configured to turn on power supply as to the section; wherein the setting circuit switches, in the case that data transmission using the section is enabled according to turning on of the power supply, the detour path to a path including the section.

20 Claims, 24 Drawing Sheets

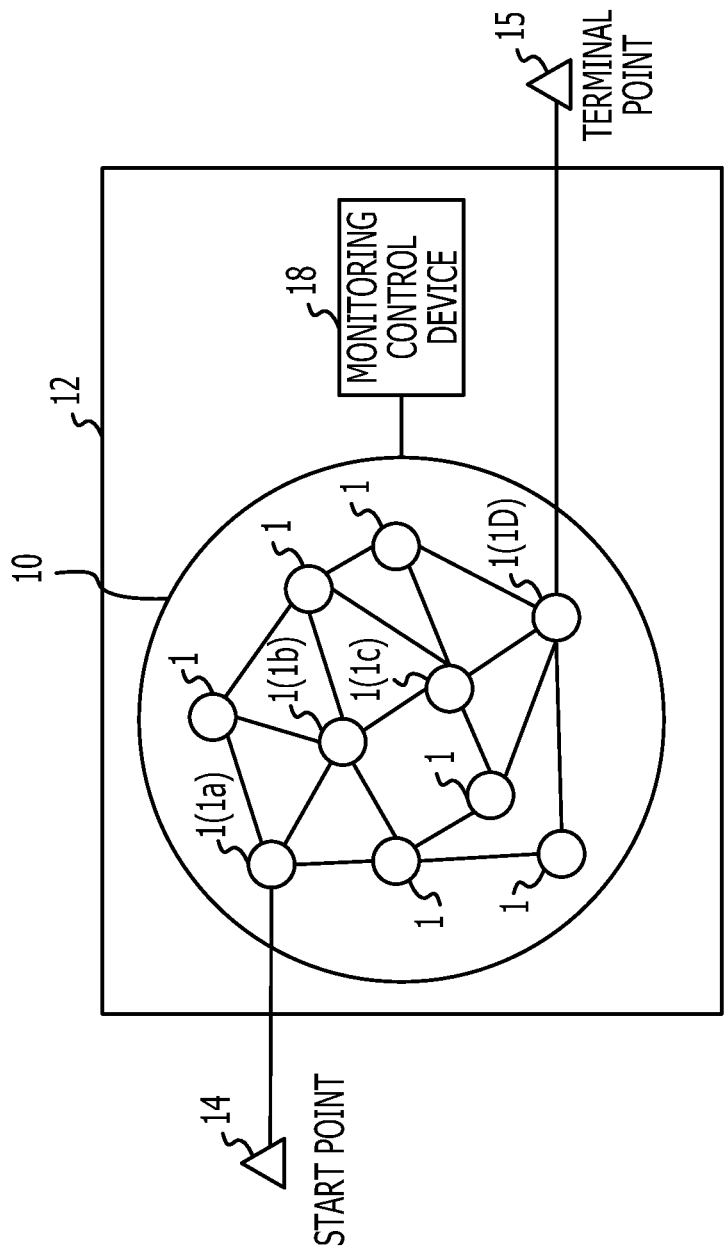

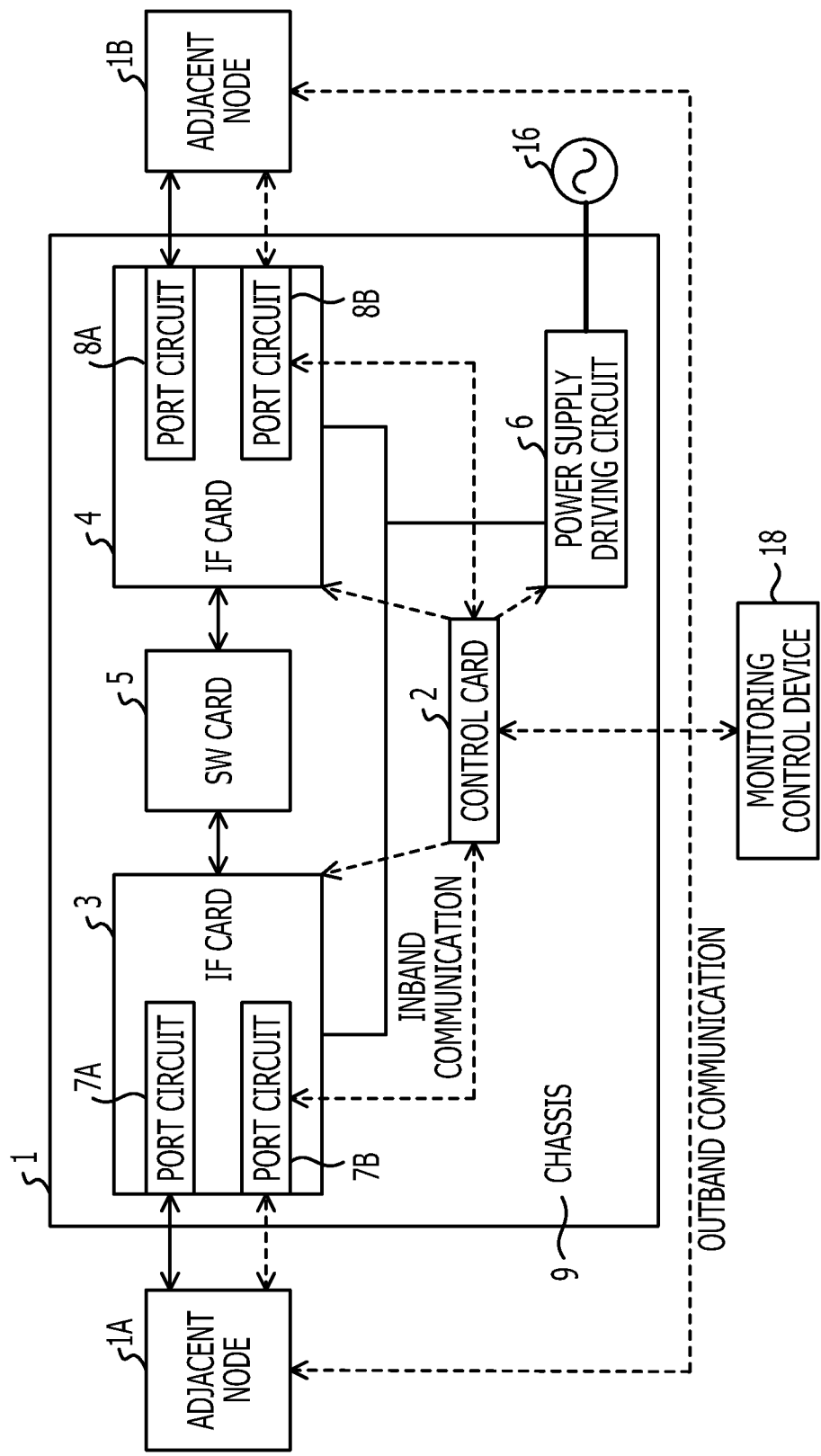

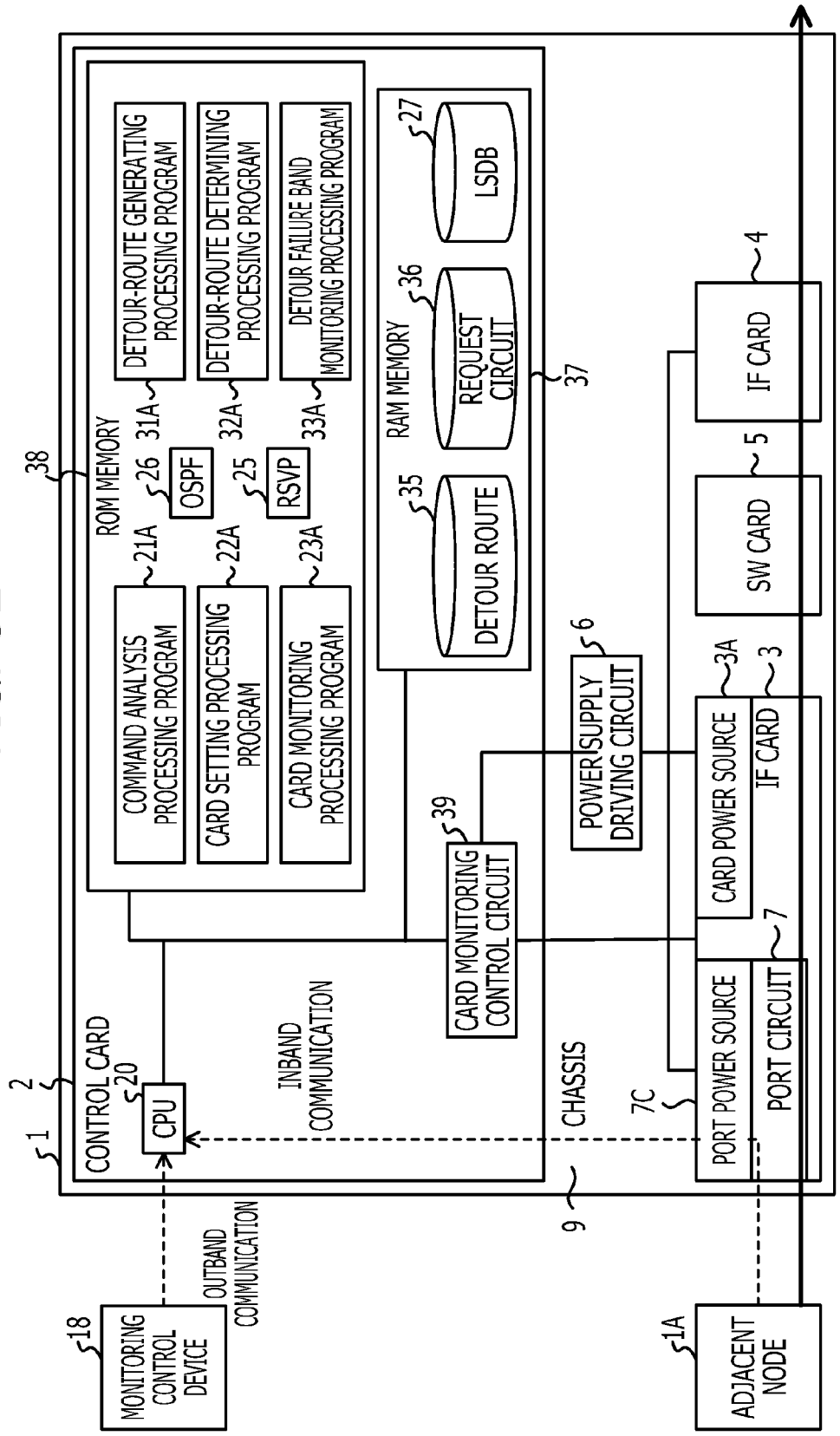

FIG. 4

| NODE ID | LINK ID | COST | BAND | AVAILABLE BAND | OPPOSED NODE ID | OPPOSED LINK ID | ~27 |
|---------|---------|------|------|----------------|-----------------|-----------------|-----|
| A | a | 4 | 192 | 10 | B | d | |
| A | b | 5 | 64 | 64 | - | - | |
| A | c | 10 | 192 | 192 | C | e | |
| A | d | 5 | 192 | 64 | D | a | |
| B | a | 3 | 192 | 0 | ... | ... | |
| B | b | 6 | 192 | 64 | ... | ... | |
| ... | ... | | ... | ... | ... | ... | |

FIG. 10

| UPSTREAM PORT | DOWNSTREAM PORT | DETOUR-ROUTE PORT 1 | DETOUR-ROUTE PORT 2 | DETOUR-ROUTE PORT 3 | DETOUR-ROUTE PORT 4 |
|---|---|---|---|---|---|
| B-a | B-d | B-c | C-a | C-d | D-c |
| B-b | B-d | B-c | C-a | C-d | D-c |
| B-c | B-d | B-b | A-a | A-d | D-b |

FIG. 14

| REQUEST ROUTE PORT 1 | REQUEST ROUTE PORT 2 | REQUEST ROUTE PORT 3 | REQUEST ROUTE PORT 4 |
|---|---|---|---|
| A-a | B-b | B-d | D-a |

COMMUNICATION DEVICE AND PATH ESTABLISHING METHOD

CROSS-REFERENCE TO RELATED APPLICATION(S)

This application is based upon and claims the benefit of priority of the prior Japanese Patent Application No. 2011-206740, filed on Sep. 22, 2011, the entire contents of which are incorporated herein by reference.

FIELD

The embodiments disclosed here are related to a communication device and a path establishing method.

BACKGROUND

In recent years, expansion of the scale of networks has led to increase in the data amount and the number of network devices on a network. Accordingly, the power consumption of network devices has increased year after year. As for a technique for reducing the power consumption of network devices, i.e., a technique for realizing power saving of network devices, various techniques have been introduced. For example, there is a technique wherein a server inquires of a client under the control thereof for the next processing start point-in-time, the client which receives this informs the next processing start point-in-time, disconnects power supply while retaining a wakeup function, the server stores transmission data for the client under disconnection of power supply, and when the next processing start point-in-time comes, transmits the stored data to the client (e.g., Japanese Laid-open Patent Publication No. 2002-157053). Also, there is a technique wherein a home gateway device is allowed to perform electric control for each unit to which power is applied, to realize low power consumption (e.g., Japanese Laid-open Patent Publication No. 2002-319956). Also, there is a technique wherein when the communication amount of a network decreases, power supply for unnecessary resources is turned off while maintaining capabilities for a network (e.g., Japanese Laid-open Patent Publication No. 2010-34792).

With a network employing a technique for realizing power saving of network devices, for example, the power of a device over a communication device included in a node relating to a path or link where no communication data flows is turned off (referred to as "node device" or "node"), whereby power saving may be realized. Hereinafter, a link of which the data transmission and reception functions are stopped due to power supply for the corresponding port being turned off will be referred to as "power supply off link". Note that a path in which the functions of all of links are stopped will be referred to as "power off path". Also, a power off link and a power off path shall be collectively referred to as "power off section". The power off section is in a state in which communication data is failed to be transmitted since power supply for the corresponding port was turned off.

On the other hand, along with the recent scale expansion of networks, introduction of the Generalized Multi-Protocol Label Switching (GMPLS) technology has been conceived, whereby reduction in the load up to path opening may be realized. With the GMPLS and Multi-Protocol Label Switching (MPLS) serving as base of the GMPLS, a communication route (path) called a Label Switched Path (LSP) connecting between multiple nodes is established beforehand. According to label switching employing this LSP established beforehand, data (packets) is transferred from a start point node equivalent to the initiator to a terminal point equivalent to the terminator. With the GMPLS and MPLS, at the time of establishing a path, Resource Reservation Protocol-Traffic Engineering (RSVP-TE) that is a signaling protocol for path establishment is employed. With the RSVP-TE, the start point node that requests a path establishment transmits a path setting request (called a Path Message) to the terminal point node by Hop-By-Hop, thereby performing path setting.

With a GMPLS network or MPLS network, a path is established with occurrence of a path opening request regarding a new path as a trigger. Also, a path for a detour route may be established due to a failure on a path established beforehand occurring. In the event that there is the above-mentioned power off section on a route where a path has to be set, it is desirable to resume power supply according to the power off section so as to properly perform data transmission within the power off section.

However, in general, hardware warming up time and configuration time for Field-Programmable Gate Array (FPGA) and so forth elapses until communication data can be successfully transmitted within the power off section after power is supplied to a port where power supply has been turned off. In this way, predetermined time elapses for restoration of the power off section, and accordingly, delay may occur between the path setting request to path opening at the time of a path setting request including the power off section. In particular, in the case of establishing a detour path including the power off section with occurrence of a failure as a trigger, service interruption may occur.

SUMMARY

According to an aspect of the invention, a communication device configured to establish a path for data transmission including a setting circuit configured to receive a request for setting a path, and in the case that the path includes a section where power supply has been turned off so as to suppress data transmission, to set a detour path for bypassing the section using detour routing information corresponding to the section; and a power supply driving circuit configured to turn on power supply as to the section; wherein the setting circuit switches, in the case that data transmission using the section is enabled according to turning on of the power supply, the detour path to a path including the section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of the configuration of a network system according to a first embodiment;

FIG. 2 is a diagram illustrating an example of the hardware configuration of a node according to the first embodiment;

FIG. 3B is a diagram illustrating an example of the detailed hardware configuration of the node according to the first embodiment;

FIG. 4 is a diagram illustrating a data configuration example of a network topology stored in an LSDB according to the first embodiment;

FIG. 10 is a diagram illustrating a data configuration example of detour routing information to be stored in a detour routing information DB of a node B;

FIG. 14 is a diagram illustrating a data configuration example of request routing information to be stored in a request routing information DB according to the first embodiment;

DESCRIPTION OF EMBODIMENTS

Hereinafter, a network system and a node device, according to an embodiment will be described with reference to the drawings. The configuration of the following embodiment is an example, and the network system and node device according to the present disclosure are not restricted to the configuration of the embodiment.

Let us say that Multi-Protocol Label Switching (MPLS) or Generalized Multi-Protocol Label Switching (GMPLS) is applied to the network system and node according to a first embodiment. Before describing the network and node according to the first embodiment, the MPLS/GMPLS and a network protocol employed with the MPLS/GMPLS will simply be described.

With the MPLS, a communication route (path) called a Label Switched Path (LSP) connecting multiple nodes is established beforehand. Data to be transmitted over the path is added with a fixed-length label. Nodes perform data transmission in accordance with label information described in the label. Thus, speeding up of communication is realized. The label information is information represented with a fixed-length label (hereafter, referred to as "label") appended to the head of a frame or packet.

Figure 20:
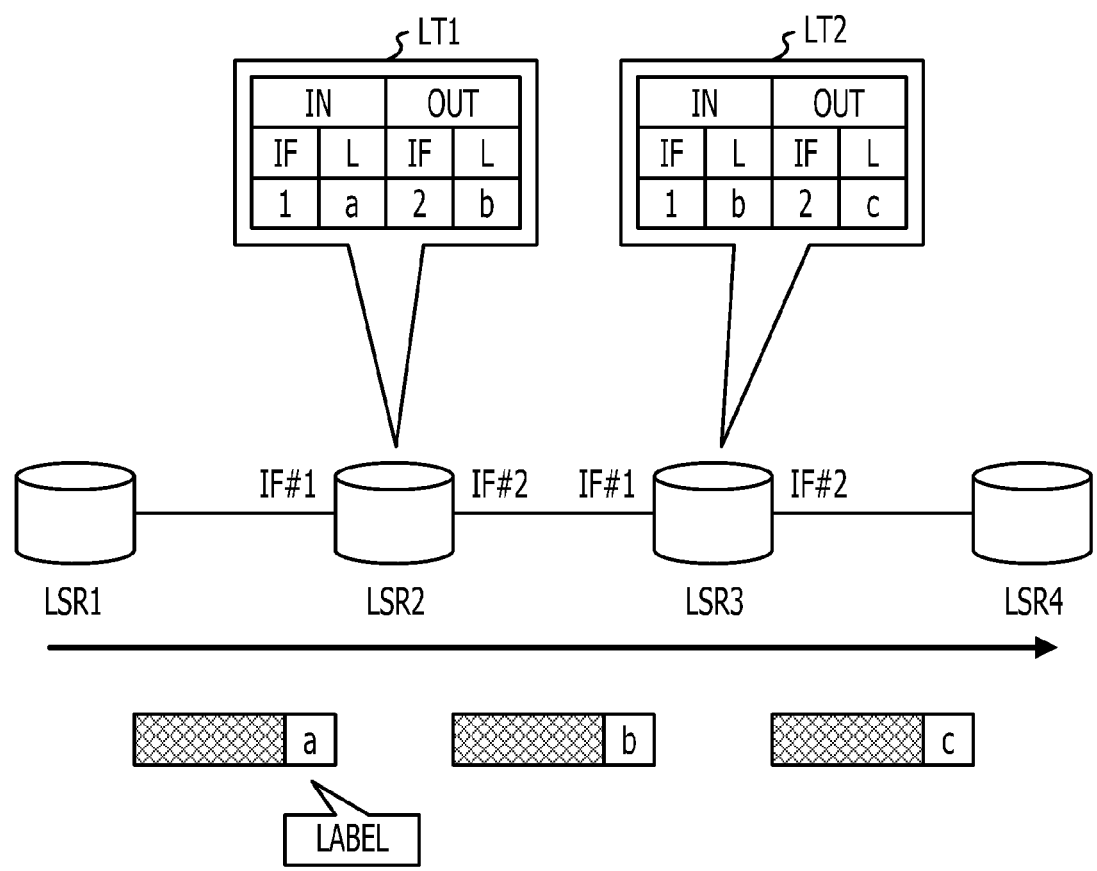
FIG. 20 is a diagram illustrating an example of a packet relay method with Multi-Protocol Label Switching (MPLS)

FIG. 20 is a diagram illustrating an example of a packet relay method according to the MPLS. With the MPLS, an MPLS network where communication devices (e.g., a router or L3 switch) called multiple Label Switched Routers (LSR) are connected by a predetermined topology is formed. A terminal (host) which performs communication using an MPLS network is connected to the MPLS network via an access network. An LSR to be disposed in a boundary between the access network and MPLS network is specially called a Label Edge Router (LER). FIG. 20 illustrates an MPLS network where multiple LSRs (LSR 1 though LSR 4) are serially connected, where data (packets) is transferred from the LSR 1 to the LSR 4 via the LSRs 2 and 3. In FIG. 20, the LSRs 2 and 3 which relay data store label tables LT1 and LT2 used at the time of data relay in a memory. The label tables indicate relationship between an input label and input Interface (IF), and an output label and an output IF.

As illustrated in FIG. 20, of a packet indicated with a rectangle, a shaded portion is actual data to be transferred, and a header including a label a, b, or c is appended to the head thereof.

The LSRs determine, at the time of packet relay, a relay destination in accordance with not an address included in a received packet but a label appended to this packet. Specifically, an LSR determines an output IF and output label corresponding to an input IF and input label at the time of a packet to be processed being input, with reference to a label table. The LSR then rewrite a label appended to a packet with the determined output label, and relays this packet from the determined output IF.

According to such processing being repeated, packets are transmitted from the transmission source to a destination. Note that the LSR at the entry of the MPLS network first appends a label to a packet input to the MPLS network.

Next, packet relay from the LSR 1 to the LSR 4 will specifically be described with reference to FIG. 20. First, the LSR 1 appends a label a to a packet, and transmits to the LSR 2. Upon receiving the packet having the label a from a predetermined input interface (IF #1), the LSR 2 searches for the label table LT1 to obtain a predetermined output IF (IF #2) and output label b. The LSR 2 then rewrites the label of the received packet from a to b, and outputs this packet to the IF #2. The same processing as with this is carried out at the LSR 3, the packet is transferred to the LSR 4 serving as the terminate point node. With the MPLS, in this way, transfer is realized in accordance with a fixed-length label, whereby speeding up of packet relay can be realized.

Further, with the MPLS, band control and each label are stored further in a correlated manner at the LSRs, whereby band guarantee as to each packet flow can be performed.

With the GMPLS, not only a fixed-length label but also time-division transmission timeslot or optical wavelength in optical multiplex transmission or the like are employed as label information. For example, in the case that optical wavelength is employed as label information, optical signals are not converted into electric signals. Thus, with the GMPLS, higher transfer processing can be realized.

With time-division transmission, the LSRs store a label table indicating relationship between the input timeslot and input IF, and output timeslot and output IF. The LSRs determine the output IF and output timeslot in accordance with the input IF and input timeslot, and outputs a packet under the determined condition. According to repeat of this processing, packets are transferred from the transmission source to a destination.

With optical multiplex transmission, each node stores a label table indicating relationship between the input optical wavelength and input IF, and the output optical wavelength and output IF. The LSRs then determine the output IF and output optical wavelength in accordance with the input IF and input optical wavelength, convert the input optical wavelength to the output optical wavelength, and output to the output IF. According to repeat of this processing, data is transmitted from the transmission source to a destination.

As described above, with the MPLS and GMPLS, it is desirable to build a label table to establish a path at the LSRs (nodes). At the time of building a label table to establish a path, a signaling protocol used for path establishment is employed. With the MPLS/GMPLS, the Resource Reservation Protocol-Traffic Engineering (RSVP-TE) is employed as a signaling protocol for path establishment.

Figure 21:
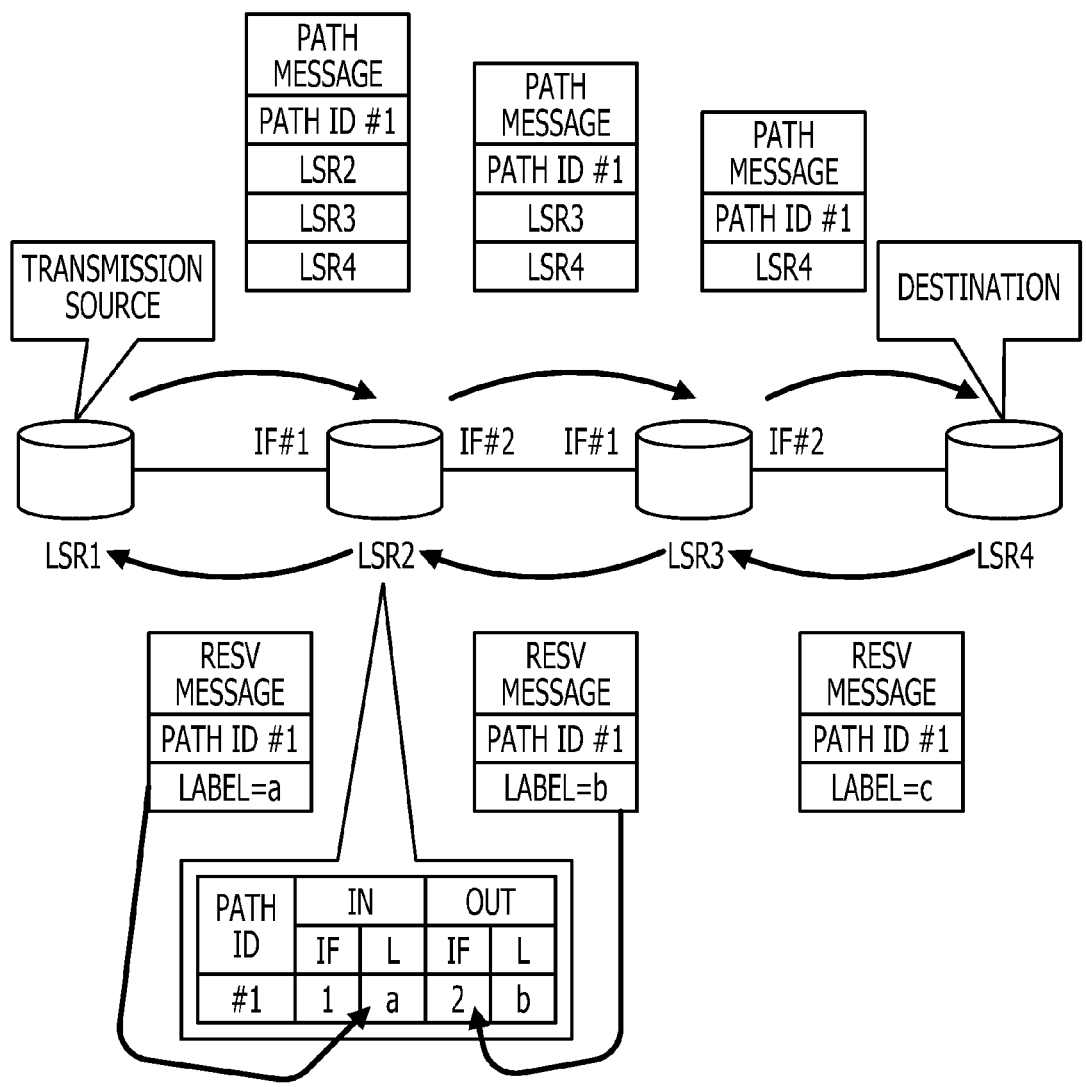
FIG. 21 is a diagram illustrating an operation example of path establishment signaling protocol (Resource Reservation Protocol-Traffic Engineering (RSVP-TE))

FIG. 21 is a diagram illustrating an operation example of the path establishment signaling protocol (RSVP-TE). The start point node for requesting path establishment (LSR 1) transmits a path establishment request message (called Path Message) to the path terminate point node (LSR 4) by Hop-By-Hop. Routing information from the start point to terminate point of a path to be set may be included in the path setting request (Path Message). For example, node information which a path to be set passes through, e.g., information of LSR 2→LSR 3→LSR 4 is included in the Path Message (drawing is omitted regarding the information of the LSR 1). With the example in FIG. 21, in order to explicitly specify the path, the information of an LSR to be passed through is inserted into the Path Message. The terminal point node which has received the Path Message transmits a path establishment response message (Reserve Message) for performing assignment of a label to the start point node. At this time, the terminal point node replies the Reserve Message to the start point node using the same path as that the Path Message passes through. At this time, a label stored in the Reserve Message is registered in the label table at each LSR, thereby building the label table at each LSR. The Identification (ID) of the path is stored in the Path Message and Reserve Message. This path ID is also registered in each label table.

The Path Message and Reserve Message that are control messages may be transmitted using a path where traffic that is digital data such as audio or document or the like to be moved over the network flows. This will be referred to as InBand communication. On the other hand, there may be a case where so as to suppress transmission of a control message from receiving influence from actual traffic, a separate line different from data traffic is prepared, such as a Local Area Network (LAN) line or the like, and the control message is transmitted by this separate line. This will be referred to as OutBand communication.

Figure 22:
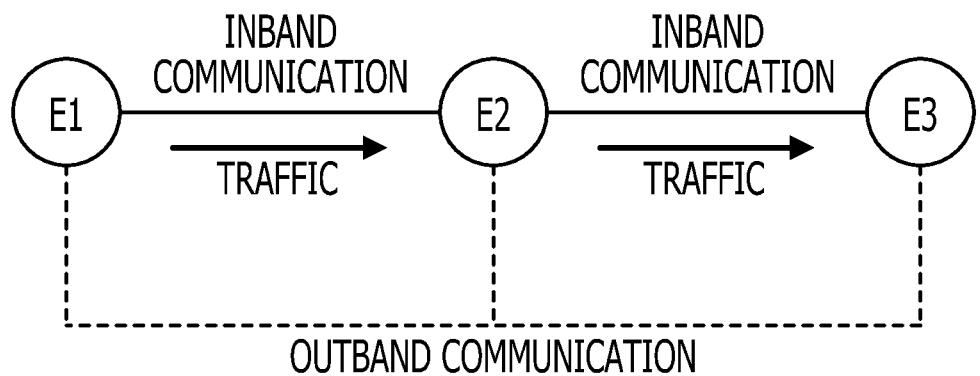
FIG. 22 is a diagram illustrating an example Inband communication and Outband communication.

FIG. 22 is a diagram illustrating an example of InBand communication and OutBand communication. In FIG. 22, a path passing through node E1, E2, and E3 (hereinafter, referred to as "path E1-E2-E3"), which is indicated with a solid line, is a path where traffic flows. Therefore, the path E1-E2-E3 indicated with a solid line is an InBand communication path. A path indicated with a dotted line in FIG. 22 is a path where no traffic flows, and is a separate line such as a LAN line or the like exemplified by the Ethernet (registered trademark). Therefore, the path indicated with a dotted line is an OutBand communication path.

As for a method for managing routing information in a network, there are "static routing" and "dynamic routing". The "static routing" is a method for manually setting routing information within each router. The "dynamic routing" is a method for a router automatically learning routing information using a routing protocol. Examples of this routing protocol include Routing Information Protocol (RIP), Open Shortest Path First (OSPF), and Border Gateway Protocol (BGP) and so forth. Hereinafter, description will be made regarding the OSPF as a specific example of a routing protocol serving as a method for managing such routing information.

The OSPF is a link state type routing protocol for collecting information from the nodes such as routers or the like to understand the current network configuration. Information of the start point and terminate point is given, and accordingly, the OSPF calculates the shortest path from the start point to the terminate point based on cost (value). The cost (value) mentioned here is the weight of a path in the OSPF. Though the cost is automatically calculated based on bandwidth or reliability or the like, the cost may manually be set. Specifically, the OSPF calculates a total of costs set to links to be passed through before the destination (terminate point). The OSPF determines a reachable path with the minimum cost, i.e., a path where a total of costs is the minimum to be the shortest path. With a network employing the OSPF, cost is set to links connected to the nodes beforehand. When calculating the shortest path, a calculation condition may be added wherein a particular node or link is not passed through. An algorithm for the OSPF calculating the shortest path will be described below.

With the OSPF, information called Link-State Advertisement (LSA) is exchanged between nodes. The cost of IF, and the information of a network connected to a node, and so forth are include in the LSA. The nodes generate a Link State Database (LSDB) based on the exchanged LSA. The LSDB stores information regarding all of the OSPF nodes and network links that is information collected from the nodes, i.e., information regarding the connection state of the entire network. The LSDB will be referred to as a topology table, a topology database, and a network topology. How many cost values are connected to which node through which node can be understood with reference to the LSDB. With the OSPF network, the nodes set a small network as one area. The nodes within the same area alone exchange the LSA, thereby storing the same LSDB. The nodes reference this LSDB to calculate the shortest path where cost from the own node to the destination becomes the minimum.

Figure 23:
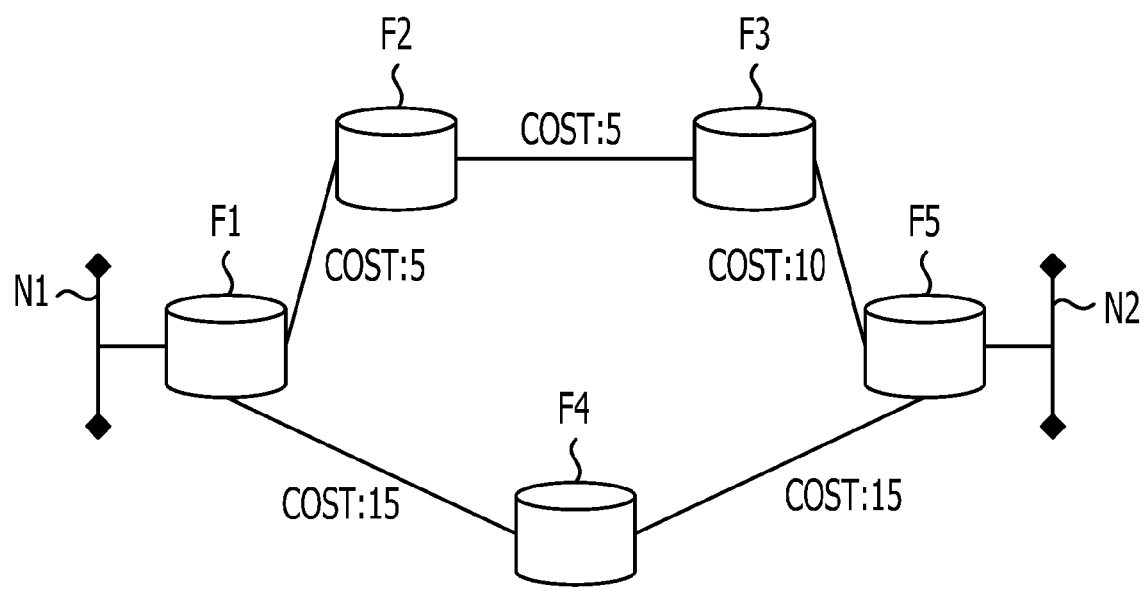
FIG. 23 is a diagram illustrating a calculation example of the shortest path in Open Shortest Path First (OSPF).

FIG. 23 is a diagram illustrating a calculation example of the shortest path according to the OSPF. F1 through F5 denote nodes, respectively. With the example in FIG. 23, there are two paths of a path F1-F2-F3-F5 and a path F1-F4-F5 from the node F1 to a destination network N2. A total of cost values of the former path becomes Cost=5+5+ 10=20. A total of cost values of the latter path becomes Cost=15+15=30. That is to say, the former is smaller in the total of the path cost values, and accordingly, the node F1 calculates (selects) the former path as the shortest path.

FIG. 1 is a diagram illustrating a configuration example of a network system according to the first embodiment. A network system 12 according to the first embodiment includes a network (core network) 10 and a monitoring control device 18 of the core network. The core network 10 includes multiple nodes 1. Multiple terminal devices (hosts) are connected to the core network 10 via an access line through an access network. With the example illustrated in FIG. 1, terminal devices 14 and 15 connected to the core network 10 via an access line are illustrated.

The nodes 1 making up the core network 10 are, for example, communication devices (router, L3 switch) which perform switching at the Internet Protocol (IP) layer called the Label Switched Router (LSR) as long as the core network 10 is an MPLS network. On the other hand, with a GMPLS network, path control is realized with not only an IP network but also an L2 switch network, TDM network, wavelength switch network, fiber switch network, or the like. Communication devices making up a node differ according to a network where path control (label switching) is performed. In the case of an IP network, routers or L3 switches are applied as the nodes 1. In the case of an L2 switch network, L2 switches or switching HUBs are applied as the nodes 1. In the case of a TDM network, TDM exchanges (TDM switch, cross connect) are applied as the nodes 1. In the case of a wavelength switch network, wavelength switches (optical cross connect) are applied as the nodes 1. In the case of a fiber switch network, optical fiber switches are applied as the nodes 1. Hereinafter, in order to simplify description, the core network 10 is assumed to be an IP network, and the nodes 1 of the core network 10 are assumed to perform IP switching.

With the core network 10, a transfer path of data (packets) called a Label Switched Path (LSP) is established at the time of performing data transmission (e.g., data transfer with the terminal device 14 as a communication start point, and with the terminal device 15 as a communication terminal point) between terminal devices. Establishment of an LSP is executed by performing setting of an input label and an output label as to the nodes 1 passing through the LSP. With the network system 12 according to the present embodiment, in response to establishment of an LSP, a signaling protocol called RSVP-TE, and a routing protocol called OSPF (OSPF-TE) are applied. However, the signaling protocol and routing protocol are not restricted to these.

At the time of applying an LSP, the monitoring control device 18 provides an LSP setting instruction to a node 1 (node 1*a* is in FIG. 1) equivalent to an LSP start point (called initiator). The LSP setting instruction includes at least information specifying the LSP start point (initiator) and a node 1 (node 1*d* in FIG. 1) equivalent to an LSP terminal point (called terminator). The setting instruction may autonomously be generated at the node 1*a*.

Upon receiving the setting instruction, the node 1*a* is generates a path setting request message (called Path Message) addressed to the node 1*d* equivalent to the terminator, following RSVP-TE. At this time, the node 1*a* is applies the result of the shortest path search using the OSPF. For example, in the event that the shortest path from the node 1*a* is to the node 1*d* is the node 1*a*→node 1*b*→node 1*c*→node 1*d*, the node 1*a* is transmits a path setting request message to the node 1*b*. Note that nodes positioned in a relay point sandwiched with the initiator and terminator such as the node 1*b*, node 1*c*, or the like are called transit nodes (Transit node).

The path setting request message reaches the node 1*d* which is a destination via the nodes 1*b* and 1*c*. A path from the node 1*b* to the node is may be determined by the node 1*a* based on the calculation result of the OSPF at the node 1*a* and stored in the path setting request. Also, an arrangement may be made wherein the calculation of the OSPF is performed at the node 1*b*, and the node 1*c* is determined to be the transfer destination of the path setting request.

Each of the nodes 1*b*, 1*c*, and 1*d* determines and registers label information (input side label) to be added to data that reaches from the node on the upstream side with reception of the path setting request message as a trigger. When determining that the own node is the terminator from the path setting request message, from the destination information, the node 1*d* which has received the path setting request message generates a reply message (called Reserve Message) of the path setting request message. The node 1*d* includes information of the identifier (ID) of the node 1*d*, and the input side label determined by the node 1*d* in the reply message.

The reply message traces in the opposite direction of the path where the path setting request message passes through, and finally reaches the node 1*a* which is the initiator. The nodes 1*c* and 1*d* determine the input side label within the reply message received from the node on the downstream side (node 1*d*, node 1*c*) to be the output side label, and register this. The nodes 1*c* and 1*b* include the identifier (ID) of the own node and the input side label determined by the own node in the reply message.

The node is 1*a* which has received the reply message registers the input side label of the node 1*b* as the output side label of the node 1*a*. In this way, an LSP is established over the core network 10. Thereafter, the node 1*a* is which has received a packet addressed to the terminal device 15 from the terminal device 14 references the destination address of the packet to add a header including the label addressed to the node 1*b* (output side label) corresponding to the destination address to the packet, and transfers to the node 1*b*.

The node 1*b* which has received the packet references a label appended to the packet to change this with the corresponding output side label (label informed from the node 1*c* by the replay message), and transfers to the node 1*c*. The node 1*c* performs the same operation as with the node 1*b*, changes the label of the packet with the label addressed to the node 1*d*, and transfers to the node 1*d*. The node 1*d* removes the header including the label from the packet, and transfers to the terminal device 15 in accordance with the destination address of the packet.

In this way, with the core network 10, according to label switching using a pre-established LSP, data (packets) is transferred from the initiator (node 1*a*) to the terminator (node 1*d*). An arrangement wherein label registration setting at all of the bases (nodes) over the path is automatically set only by the specifying the LSP start point and terminate point, is called "GMPLS A to Z provisioning".

With the core network exemplified in FIG. 1, the multiple nodes are connected in a mesh manner. However, the topology of the multiple nodes 1 may be a ring type or full connector type or the like.

As illustrated in FIG. 1, the network system 12 includes the network 10 (core network) which is a group of the multiple nodes 1 connected in a mesh manner, and the monitoring control device 18 for the core network. The monitoring control system 18 is an information processing device configured to monitor and control the state of the entire network 10, i.e., a computer. The monitoring control device 18 is connected to all of the nodes 1 included in the network 10. The monitoring control device 18 can monitor the configuration of the network 10 and the use situations of the network 10 by monitoring the states of all of the nodes 1. The monitoring control device 18 determines an unused section where communication data within the network 10 flows by monitoring the network 10, and transmits a power supply off request to the node 1 according to the unused section. The monitoring control device 18 transmits a path opening request to the node 1 equivalent to the initiator.

Communication data transmitted from a start point 14 (terminal device: host) out of the network 10 is transmitted to a terminal point 15 which is an object via the nodes. The number of the nodes and the number of adjacent nodes at the nodes are not restricted to the numbers indicated in FIG. 1.

The network 10 is a network to which the above-mentioned energy saving technique has been applied. Therefore, as described above, power feeding to an unused port according to an unused section is set to off. With the present first embodiment, before the power supply of the unused port is turned off, a detour route for bypassing the unused section is calculated beforehand, the power supply of the port corresponding to the unused section is then turned off. Thus, in the event that a request for setting a path passed through this power off section occurs, a path is opened to a path including the detour route (detour path), and a path passed through the power off section can be set at the time of the power off section being successfully activated. That is to say, while the power off section is successfully activated, communication data can be transmitted to the detour path, and accordingly, service interruption due to time used for activating the power off section (port) can be suppressed. With the present first embodiment, this node constantly monitors the state of the detour route corresponding to the power off section, and upon detecting a failure of the detour route, calculates another detour route, and updates the detour route. Note that, in the case that there is no another detour route, there is no alternative path corresponding to the power off section, and accordingly, there may be caused service interruption. Accordingly, in this case, this node determines that the power off state of the power off section is failed to be maintained, and turns on the power supply of the port according to this power off section. Hereinafter, the node according to the present first embodiment will be described.

FIG. 2 is a diagram illustrating an example of the hardware configuration of the node 1 according to the first embodiment. As illustrated in FIG. 2, the node 1 includes a control card 2, interface cards 3 and 4 (hereafter, referred to as "IF card"), and a switching card 5 (hereafter, referred to as "SW card"). The cards 2, 3, 4, and 5 are provided within a casing (chassis) 9 of the node 1. Note that solid-line arrows illustrated in FIG. 2 indicate the flow of communication data, and dotted-line arrows indicate the flow of control data.

The control card 2 receives control data from the monitoring control device 18 or adjacent node 1A or 1B, and performs hardware setting or processing or the like of the cards according to a request from the monitoring control device 18 or adjacent node 1A or 1B included in this control data.

The IF card 3 includes port circuits 7A and 7B which house a line as to the outside (network). The IF card 4 includes port circuits 8A and 8B which house a line as to the outside (network). The port circuits are interfaces used for input/output of information as to an external device. With the present first embodiment, an example is illustrated wherein only one link as to an adjacent node is connected to one port circuit. However, the connection mode is not restricted to this, and multiple links may be connected to one port circuit.

Though the IF cards include two port circuits in FIG. 2, let us say that with the present first embodiment, the IF cards include only one port circuit. Note that, as illustrated in FIG. 2, the IF cards may include multiple port circuits. That is to say, with the present first embodiment, only once port circuit to which only one link with an adjacent node is connected is included in one IF card. Accordingly, with the present first embodiment, the number of port circuits that a node includes becomes equal to the number of links to be connected to the node.

The IF card 3 performs transmission/reception of communication data with the adjacent node 1A connected thereto via a line using the port circuit 7A. The IF card 3 performs transmission/reception of control data with the adjacent node 1A connected thereto via a line using the port circuit 7B. Similarly, the IF card 4 is connected to the adjacent node 1B via a line using the port circuit 8A, thereby performing transmission/reception of communication data with the adjacent node 1B. The IF card 4 is connected to the adjacent node 1B via a line using the port circuit 8B, thereby performing transmission/reception of control data with the adjacent node 1B. Note that, as described above, in the case that an IF card includes only one port circuit, the IF card performs transmission/reception of both of communication data and control data with an adjacent node using the one port circuit.

The data received at the IF cards 3 and 4 is input to the SW card 5. The SW card 5 references a label appended to the input data to transmit the data to the IF card 3 or 4 corresponding to the destination of the data. For example, the SW card 5 transfers the data (having a label addressed to the adjacent node 1B) from the adjacent node 1A received at the IF card 3 to the IF card 4 connected to the adjacent node 1B. The SW card 5 transfers the data (having a label addressed to the adjacent node 1A) from the adjacent node 1B to the IF card 3 connected to the adjacent node 1A. Thus, the communication data from the adjacent node is transmitted to the transfer destination in accordance with the label (e.g., another adjacent node).

Each of the control card 2, IF cards 3 and 4, and SW card 5 may be a control circuit, interface circuit, or switching circuit.

The chassis 9 includes multiple slots which are not illustrated, and each slot includes a card connector (not illustrated). The cards 2 through 5 are connected to a connector by being inserted into the corresponding slot, whereby between cards becomes an electrically connected state.

The node 1 includes a power supply driving circuit 6. The power supply driving circuit 6 controls on/off as to power feeding of power to be supplied from an external power source 16 to the cards 3 and 4. The power supply driving circuit 6 may also on/off of power feeding for each port circuit at the cards 3 and 4. Note that the power supply driving circuit 6 is an example of "power supply driving circuit". The external power source 16 may be an internal power source (e.g., secondary battery) mounted within the node 1.

With the present first embodiment, LSP establishment, and control messages relating to deletion (e.g., path message, reserve message) may be carried out by InBand communication that flows on the same path as with user data. Alternatively, OutBand communication may be carried out wherein control messages are transmitted/received through a line (e.g., LAN) different from the transfer path of user data. Though both paths of InBand communication and OutBand communication are illustrated, one of both may be provided. Hereinafter, the detailed configuration of the node 1 according to the present first embodiment will be described.

Figure 3A:
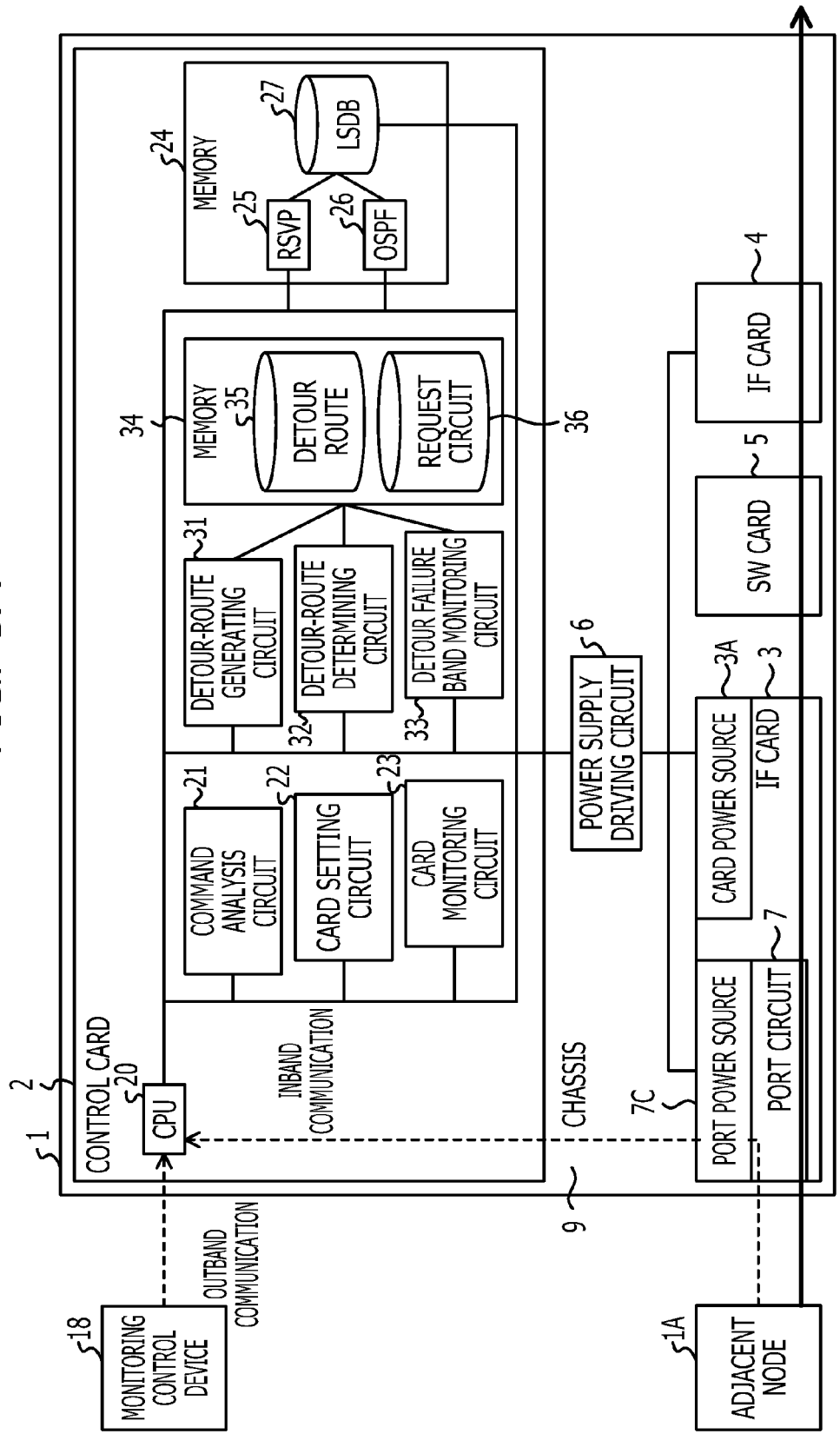
FIG. 3A is a diagram illustrating an example of the detailed hardware configuration of the node according to the first embodiment.

FIG. 3A is a diagram illustrating an example of the detailed hardware configuration of the node according to the first embodiment. The portions in FIG. 3A denoted with the same reference numerals as with FIG. 2 described above represent the same portions, and accordingly, detailed description thereof will be omitted. Also, with the description in FIG. 3A, description of the adjacent node 1B illustrated in FIG. 2 is omitted, and only relationship between the node 1 and the adjacent node 1A will be described. The IF card 4 has the same configuration as with the IF card 3, and accordingly, the detailed description of the IF card 4 will be omitted.

As illustrated in FIG. 3A, the node 1 includes the control card 2, IF cards 3 and 4, SW card 5, and chassis 9. The cards and power supply driving circuit 6 are implemented in the chassis 9. The power supply driving circuit 6 performs on/off of power feeding to the cards and power feeding to the port circuit.

The IF card 3 includes a port circuit 7, a port power source 7C which supplies power to the port circuit 7, and a card power source 3A which supplies power to the IF card 3. Note that the power supply driving circuit 6 performs on/off of power feeding to the card power source 3A to control on/off of power feeding to the IF card 3. The power supply driving circuit 6 performs on/off of power feeding to the port power source 7C to control on/off of power feeding to the port circuit 7. Note that in the case that the IF card includes only one port circuit, the port power source may be omitted.

Hereinafter, the detailed configuration of the control card 2 will be described.

The control card 2 includes, as illustrated in FIG. 3A, a Central Processing Unit (CPU) 20, a command analysis circuit 21, a card setting circuit 22, a card monitoring circuit 23, and a memory 24. The control card 2 according to the present first embodiment includes, as illustrated in FIG. 3A, a detour-route generating circuit 31, a detour-route determining circuit 32, a detour failure band monitoring circuit 33, and a memory 34. Note that, though the node 1 is assumed to include only one CPU 20, a function realized by the CPU 20 may be processed by multiple CPUs (processors) in a distributed manner.

The CPU 20 receives control data from the monitoring control device 18 or adjacent node 1A or 1B, and performs the entire control of the node 1. That is to say, the CPU 20 performs control of the operation of each card or circuit or the like. Specifically, the CPU 20 executes a program loaded into the memory 24 or other memory in an executable manner to provide the function of the node 1. Note that the CPU 20 controls the card setting circuit 22, power supply driving circuit 6, and so forth.

The command analysis circuit 21 analyzes, upon receiving control data, a command included in the received control data, i.e., request contents, and requests processing according to the request contents from each of the portions.

The card setting circuit 22 performs hardware setting of each card based on the request contents of the control data analyzed by the command analysis circuit 21. Note that the card setting circuit 22 is an example of "setting circuit".

The card monitoring circuit 23 monitors the states of the IF cards 3 and 4 and SW card 5.

The memory 24 stores data to be processed, and a program (software) that the CPU 20 executes, and so forth. Examples of the memory 24 include ROM (Read Only Memory) and RAM (Random Access Memory). A RSVP program 25, an OSPF program 26, and link state database (LSDB) 27 are stored in the memory 24.

The RSVP program 25 is a program (software) wherein the RSVP-TE that is a path establishment signaling protocol is implemented. The CPU 20 loads and executes the RSVP program 25 stored in the memory 24, and accordingly, the RSVP-TE procedure is executed. Specifically, upon the RSVP program 25 being executed, control data for the own node is extracted from a Path Message that is control data for path setting request, the control data of other portions other than the control data for the own node is transferred to an adjacent node. A label stored in the Reserve Message for path setting request is extracted by the RSVP program 25 being executed, and is registered in a label table which is not illustrated. The Reserve Message is transferred to another adjacent node by the RSVP program 25 being executed.

The OSPF program 26 is a program (software) wherein the OSPF that is a routing protocol is implemented. The CPU 20 loads and executes the OSPF program 26 stored in the memory 24, and accordingly, the OSPF procedure is executed. Specifically, upon the OSPF program 26 being executed, the state of a path within the node 1, i.e., the states of the IF cards 3 and 4 are reflected on the network topology within the LSDB 27.

For example, in the case that the corresponding path becomes unavailable due to a failure or setting, the LSDB 27 is updated so as to set the available band of this path to 0. The path states within the node 1 are informed to the adjacent nodes 1A and 1B by the OSPF program 26 being executed. Specifically, the LSA is transmitted to the adjacent nodes 1A and 1B. Note that examples of the states of the IF card include an available band. The shortest path for performing path opening is calculated by the OSPF program 26 being executed.

The LSDB 27 stores information of the network topology to which the node is connected. Specifically, with the LSDB 27, information indicating the connection state of each adjacent node and the normal/abnormal state of the port in the network to which the node is connected is stored. For example, upon a link failure occurring, communication with an adjacent node is in inexecutable state, and accordingly, in the case that such a link failure is detected in the OSPF, search for the shortest path is performed so as to detour this link.

FIG. 4 is a diagram illustrating a data configuration example of a network topology to be stored in the LSDB 27 according to the first embodiment. As illustrated in FIG. 4, the items of a node ID, a link ID, cost, band, available band, opposed node ID, and opposed link ID are included in each row of the LSDB 27. The node ID is an identifier for identifying a node, and the link ID is an identifier for identifying a link with another adjacent node opposed in the node, i.e., the port. The band is a band used for link, and the available band indicates an available band within said band. With regard to a link that is unavailable due to a failure or stetting, the available band of the corresponding record becomes 0. The opposed node ID and opposed link ID indicate, with a link indicated by the above-mentioned node ID and link ID, the node ID and link ID of a node opposed to the above node.

Note that, with each row of the LSDB, information for identifying the record of each row, e.g., the item of a number indicating a row number or the like, or failure information, or the like may be included. Each row in FIG. 4 represents information regarding each link in each node.

The detour-route generating circuit 31 calculates, upon receiving control data for a power supply off request regarding a certain unused link, a detour route regarding this unused link. Note that the OSPF program 26 is used for calculating a detour route. The detour-route generating circuit 31 instructs the power supply driving circuit 6 to turn off power feeding to the port according to this unused link after calculation of a detour route. The detour-route generating circuit 31 is an example of "calculation circuit".

The detour-route determining circuit 32 determines, upon receiving control data for path setting request, whether or not a path requested for path setting passes through a power supply off link based on this control data. As a result of determination, in the case that the path requested for path setting includes a power supply off link, the detour-route determining circuit 32 bypasses the path setting request to a detour route. On the other hand, in the case that a power supply off link is not included in the path requested for path setting, the detour-route determining circuit 32 does not detour the path setting request, and transmits to the path requested for path setting.

The detour failure band monitoring circuit 33 extracts, regarding a detour route registered in a later-described detour routing information database 35, the state of this detour route from the LSDB 27, and constantly monitors whether or not this detour route is normal. For example, the detour failure band monitoring circuit 33 detects occurrence of a failure over the detour route, depletion of the band of the detour route, or the like. The detour failure band monitoring circuit 33 can detect the failure by the card monitoring circuit 23 within the own node which has detected a failure in the link connected to the own node informing the effect thereof, for example. The detour failure band monitoring circuit 33 may extract occurrence of a failure in a link not connected to the own node, from the LSDB 27, for example.

The memory 34 stores data to be processed, a program (software) that the CPU 20 executes, and so forth. Examples of the memory 34 include ROM (Read Only Memory) and RAM (Random Access Memory). A detour routing information database (hereafter, referred to as "DB") 35 and a request routing information DB 36 are stored in the memory 34. Note that the memory 34 is an example of "memory".

The detour routing information DB 35 is a database in which a detour route that is a path for bypassing a power supply off link, i.e., a path serving as an alternative of a power supply off link, calculated for each path passing through the power supply off link, is registered. The database configuration of the detour routing information DB 35 will be described in detail with description of Operation Example 1.

The request routing information DB 36 is a database in which information of a path requested for path setting included in a path setting request is recorded. Request routing information is temporarily stored in the request routing information DB 36 at the time of transmitting a control message for path setting request by bypassing this to a detour route. The database configuration of the request routing information DB 36 will be described in detail with description of Operation Example 1.

Note that, in FIG. 3A, the memory 24 which stores the RSVP program 25, OSPF program 26, and LSDB 27, and the memory 34 which stores the detour routing information DB 35 and request routing information DB 36 are taken as separate two types of memory, but may be the same memory. With the present first embodiment, in the case that there are multiple types of memory as illustrated in FIG. 3A, a combination between memory and a program or database to be stored in the memory thereof is not restricted, any combination may be employed.

With the present first embodiment, the RSVP and OSPF are assumed to be implemented in the program, but the object to be implemented is not restricted to this, and the RSVP and OSPF may be implemented in a hardware circuit. The RSVP program 25 and OSPF program 26 are assumed to be executed by the CPU 20, but may be executed by another processor which is not illustrated.

Note that the above-mentioned hardware circuits illustrated in FIG. 3A may be integrated into one Integrated Circuit (IC), or may be integrated by being divided into multiple ICs. For example, the above-mentioned hardware circuits may be a Large Scale Integration (LSI).

The processes of the command analysis circuit 21, card setting circuit 22, card monitoring circuit 23, detour-route generating circuit 31, detour-route determining circuit 32, and detour failure band monitoring circuit 33 which are the hardware circuits illustrated in FIG. 3A may be implemented by a program. Hereinafter, description will be made regarding a case where the processes of these hardware circuits have been implemented by a program, with reference to FIG. 3B.

FIG. 3B is a diagram illustrating an example of the detailed hardware configuration of the node according to the first embodiment. The portions in FIG. 3B denoted with the same reference numerals as with FIG. 21 described above represent the same portions, and accordingly, detailed description thereof will be omitted. With the description in FIG. 3B, description of the adjacent node 1B illustrated in FIG. 2 is omitted, and only relationship between the node 1 and the adjacent node 1A will be described. The IF card 4 has the same configuration as with the IF card 3, and accordingly, the detailed description of the IF card 4 will be omitted. Note that, with the following description, only a configuration different from FIG. 3A will be described.

As illustrated in FIG. 3B, the control card 2 includes the CPU 20, RAM memory 37, ROM memory 38, and card monitoring control circuit 39. The card monitoring control circuit 39 is a hardware circuit for performing monitoring and control regarding the cards to perform access between cards.

The RAM memory 37 is main memory for storing data to be processed, and a program that the CPU 20 executes. Detour routing information DB 35, request routing information DB 36, and LSDB 27 are stored in the RAM memory 37.

The ROM memory 38 is main memory for storing data to be processed, and a program that the CPU 20 executes. A RSVP program 25, an OSPF program 26, a command analysis processing program 21A, a card setting processing program 22A, and a card monitoring processing program 23A are stored in the ROM memory 38. Further, a detour-route generating processing program 31A, a detour-route determining processing program 32A, and a detour failure band monitoring processing program 33A are stored in the ROM memory 38.

The command analysis processing program 21A is a program where processing to be executed at the command analysis circuit 21 in FIG. 3A is implemented. The card setting processing program 22A is a program where processing to be executed at the card setting circuit 22 in FIG. 3A is implemented. The card monitoring processing program 23A is a program where processing to be executed at the card monitoring circuit 23 in FIG. 3A is implemented. The detour-route generating processing program 31A is a program where processing to be executed at the detour-route generating circuit 31 in FIG. 3A is implemented. The detour-route determining processing program 32A is a program where processing to be executed at the detour-route determining circuit 32 in FIG. 3A is implemented. The detour failure band monitoring processing program 33A is a program where processing to be executed at the detour failure band monitoring circuit 33 in FIG. 3A is implemented.

Note that the above-mentioned programs 21A through 23A, 25, 26, and 31A through 33A are taken as separate programs, but are not restricted to this. For example, the programs 21A through 23A, 25, 26, and 31A through 33A may be one program, or only a part of these programs may collectively be taken as one program. Note that each process is executed by the CPU 20 loading and executing each of these programs. Note that these programs may be executed not by the CPU 20 but by another processor which is not illustrated.

With the detailed hardware configurations 1 and 2 of the node in FIG. 3A and FIG. 3B, the power supply driving circuit 6 is assumed to be a hardware circuit, but is not restricted to this. For example, the processing of this hardware circuit may be implemented in a program.

Hereinafter, the functions that the node 1 according to the present first embodiment illustrated in FIG. 3A and FIG. 3B realizes will be described with reference to FIG. 5.

Figure 5:
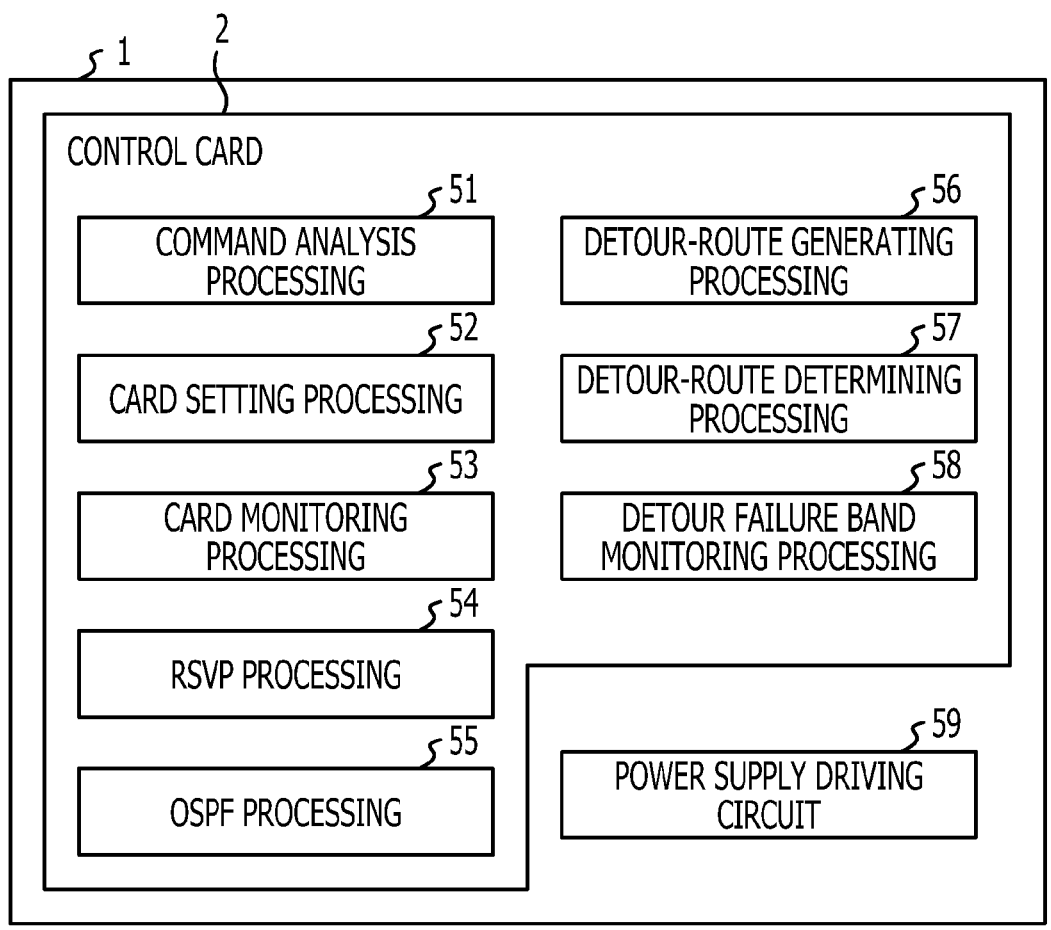
FIG. 5 is a diagram illustrating an example of a function block diagram of the node according to the first embodiment.

FIG. 5 is a diagram illustrating an example of the function block diagram of the node 1 according to the first embodiment. As illustrated in FIG. 5, the CPU 20 in the control card 2 of the node 1 illustrated in FIG. 3B executes various types of programs stored in the ROM memory 38, thereby realizing functions serving as command analysis processing 51, card setting processing 52, card monitoring processing 53, RSVP processing 54, OSPF processing 55, detour-route generating processing 56, detour-route determining processing 57, and detour failure band monitoring processing 58. The node 1 includes a power supply driving circuit 59.

With the command analysis processing 51, a command included in the received control data, i.e., request contents are analyzed, and processing according to the request contents are requested from the processes.

With the card setting processing 52, the hardware setting of each card is performed based on the request contents of the received control data. Specifically, with the card setting processing 52, hardware setting is performed on the IF card and SW card corresponding to the port of the own node where the path passes through so as to open this detour route.

With the card monitoring processing 53, the states of the IF cards 3 and 4, and SW card 5 are monitored. With the card monitoring processing 53, for example, confirmation is made regarding whether or not a failure occurs on the hardware by polling a hardware failure register provided within the IF card. Note that the hardware failure register is a register in which information indicating whether or not there is a failure state in the hardware of the IF card is stored and power supply off is treated as a sort of a hardware failure. With the hardware failure register, a flag indicating including a failure "1"/including no failure "0" is stored as information indicating whether or not there is a hardware failure, for example. The polling mentioned here is to recognize transitions of the states of the IF cards 3 and 4 and so forth by periodically extracting information of the IF cards 3, 4, and so forth from the IF cards 3, 4, and so forth at the card monitoring processing 53.

With the RSVP processing 54, the procedure of the RSVP-TE that is a path establishment signaling protocol is executed. Specifically, with the RSVP processing 54, control data for the own node is extracted from a Path Message that is control data for path setting request, the control data of other portions other than the control data for the own node is transferred to an adjacent node. With the RSVP processing 54, a Reserve Message as to path setting request is received from an adjacent node, a label stored in this Reserve Message is extracted, and is registered in a label table that is not illustrated. With the RSVP processing 54, the Reserve Message is transferred to another adjacent node.

With the OSPF processing 55, the procedure of the OSPF that is a routing protocol is executed. Specifically, with the OSPF processing 55, the states of the paths within the node 1, i.e., the states of the IF cards 3 and 4 are reflected on the LSDB 27. For example, in the case that this path has become unavailable due to a failure or setting, the LSDB 27 is updated so as to set the available band of this path to 0. With the OSPF processing 55, the path state within the node 1 is informed to the adjacent nodes 1A and 1B. That is to say, with the OSPF processing 55, the LSA is transmitted to the adjacent nodes 1A and 1B. With the OSPF processing 55, the shortest path for performing path opening is calculated. For example, with the OSPF processing 55, the shortest path that bypasses an unused link is calculated.

With the detour-route generating processing 56, upon receiving control data for power supply off request regarding a certain unused link, a detour route regarding this unused link is calculated. Specifically, with the detour-route generating processing 56, a detour route regarding all of the paths passed through this unused link from the own node is calculated. "all of the paths passed through this unused link" mentioned here mean all of the paths flowing into the unused link. Note that, at the time of calculating a detour route, with the detour-route generating processing 56, it is instructed to calculate a detour route so as to become the shortest path at the OSPF processing 55. With the detour-route generating processing 56, after calculation of a detour route, detour routing information is stored in the detour routing information DB 35. With the detour-route generating processing 56, the power supply driving circuit 59 is instructed to turn off power feeding to the port according to this unused link.

With the detour-route determining processing 57, upon receiving control data for path setting request, determination is made regarding whether or not a path requested for path setting passes through a power supply off link connected to the own node, based on this control data. That is to say, determination is made regarding whether or not a path requested for path setting includes a power supply off link connected to the own node. As a result of determination, in the case that a path requested for path setting includes a power supply off link, with the detour-route determining processing 57, the path setting request is detoured to a detour route. On the other hand, in the case that a path requested for path setting does not include a power supply off link, with the detour-route determining processing 57, the path setting request is not detoured, and transmitted to the path requested for path setting.

With the detour failure band monitoring processing 58, regarding a detour route registered in the detour routing information DB 35, the state of this detour route is extracted from the LSDB 27, and monitoring is constantly performed regarding whether or not this detour route is normal. For example, with the detour failure band monitoring processing 58, occurrence of a failure over a detour route, depletion of the band of the detour route, or the like is detected. With the detour failure band monitoring processing 58, for example, as a result of the card monitoring processing 53 within the own node which detects a failure in a link connected to the own node, the effect thereof is informed, whereby detection of the failure can be performed. Also, with the detour failure band monitoring processing 58, for example, occurrence of a failure in a link not connected to the own node can be extracted from the LSDB 27. Also, with the detour failure band monitoring processing 58, the detour routing information DB 35 is referenced, whereby determination can be made that the IF card port determined to be a failure by the card monitoring processing 53 corresponds to a power supply off link. In this case, with the detour failure band monitoring processing 58, it is not informed that this IF card port is in an off state at the time of performing the OSPF processing 55.

The power supply driving circuit 59 performs on/off of power feeding to the cards, and power feeding to the port circuit.

An operation example of the node 1 according to the present first embodiment will be described below.

Operation Example 1-1

With the network 10, operation until a node of which the outage has been requested regarding an unused link turns off power supply of the corresponding IF card or port circuit (hereafter, referred to as "card/port") will be described with reference to the flow in FIG. 6. Hereinafter, on/off of power supply of the IF card/port according to a link means on/off of power feeding to the port corresponding to a link. Specifically, turning on/off of the power supply of the IF card/port means turning on/off of power feeding to at least one of the card power source 3A and port power source 7C of the IF card illustrated in FIGS. 3A and 4. For example, in the case that the IF card includes one port circuit alone, power feeding is turned on/off regarding both of the card power source 3A and port power source 7C. On the other hand, in the case that the IF card includes multiple port circuits, power feeding is turned on/off regarding only the port power source of the port circuit to be turned on/off. The outage of a link means a state in which, with both end nodes of a link, data is suppressed from flowing into this link by turning off power supply of the IF card/port corresponding to this link.

Figure 6:
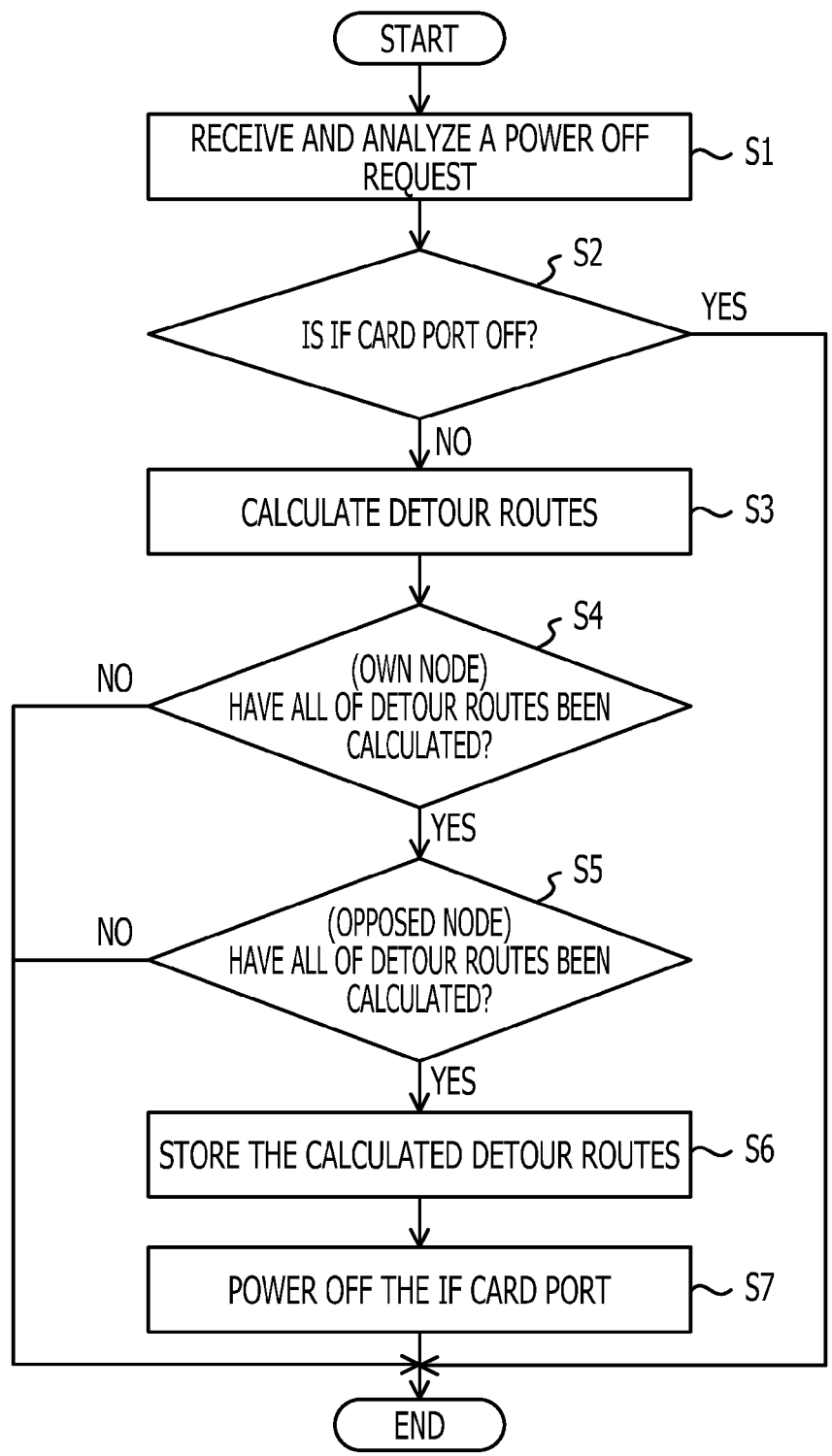
FIG. 6 is a diagram illustrating an example of a detour-route generation and route outage flow according to the first embodiment.

FIG. 6 is a diagram illustrating an example of a detour route generation and route outage flow according to the first embodiment. The monitoring control device 18 monitors the entire network 10, whereby an unused section where communication data does not flow can be determined. Upon determining an unused section, the monitoring control device 18 instructs a power supply off request regarding this unused link as to only the node connected to an unused link included in the unused section.

Figure 7:
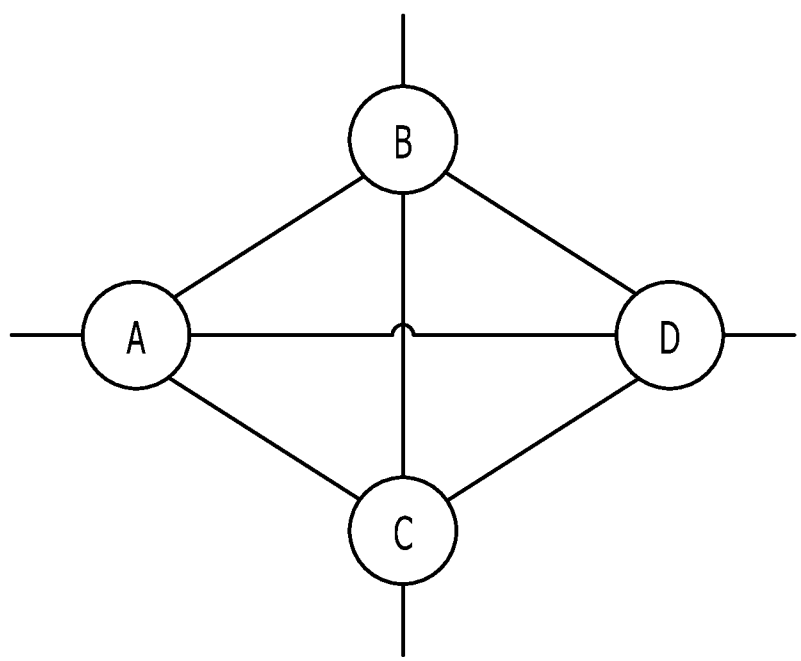
FIG. 7 is a diagram exemplifying a portion of a network according to an Operation Example 1-1.

FIG. 7 is a diagram exemplifying a portion of the network 10 according to Operation Example 1-1. Nodes A, B, C, and D equivalent to the nodes 1 illustrated in FIG. 1 are illustrated in FIG. 7.

Figure 8:
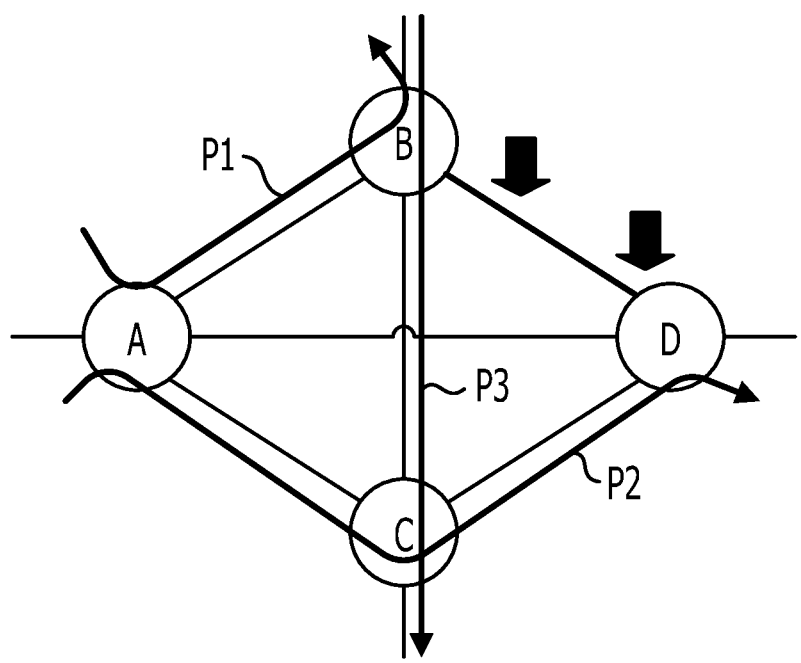
FIG. 8 is a diagram illustrating a path setting state example in the network illustrated in FIG. 7.

FIG. 8 is a diagram illustrating a path setting state example in the network illustrated in FIG. 7. With the example illustrated in FIG. 8, a path P1 (→node A→node B→), a path P2 (→node A→node C→node D), and a path P3 (→node B→node C→) have been established. The monitoring control device 18 manages and monitors a path under establishment, and determines that a section (link) between the node B and node D is unused, and power supply according to this section (referred to as "link B-D") can be turned off.

At this time, the monitoring control device 18 transmits control data for turning off power supply according to the link B-D (hereafter, referred to as control message "power supply off request") from the node B to the node D. The nodes B and D include components illustrated in FIGS. 2 and 3A, or FIGS. 2 and 3B. The nodes A and C may have the same configuration as with the nodes B and D, or may have the configuration of a node (referred to as "existing node" for convenience) not having a storing function of detour routing information according to power supply off, and so forth. For example, the nodes A and C may be nodes (existing nodes) which do not include the detour-route generating circuit 31, detour-route determining circuit 32, detour failure band monitoring circuit 33, detour routing information DB 35, request routing information DB 36 and so forth in FIG. 3.

The flowchart illustrated in FIG. 6 is started at the nodes B and D with reception of a power supply off request as a trigger. With the command analysis processing 51 at the node B (FIG. 5) (command analysis circuit 21 (FIG. 3A)), control data that is this power supply off request is received from the monitoring control device 18 (step 1, hereafter, represented as S1). With the command analysis processing 51, request contents included in this control data are analyzed (S1). Thereafter, with the command analysis processing 51, it is instructed to perform calculation of a detour route regarding the link B-D that is an unused link requested for power supply off at the detour-route generating processing 56 (FIG. 5) (detour-route generating circuit 31 (FIG. 3A)).

With the detour-route generating processing 56, upon calculation of a detour route being instructed regarding the unused link B-D, confirmation is made regarding whether or not the IF card/port within the own node corresponding to this unused link B-D has already been powered off (S2). In the case that the IF card/port within the own node corresponding to this unused link B-D has already been powered off (S2; Yes), the processing illustrated in FIG. 6 is ended. On the other hand, the IF card/port within the own node corresponding to the unused link B-D has been powered on (S2; No), with the detour-route generating processing 56, a detour route regarding all of the path setting patterns that pass through this unused link B-D from the own node is calculated (S3). Specifically, with the detour-route generating processing 56, a detour route is calculated regarding all of the path setting patterns that flow into the port corresponding to the unused link from a port other than the port corresponding to the unused link at the own node. Note that, with the detour-route generating processing 56, it is instructed to perform calculation of a detour route serving as the shortest path with the OSPF processing 55 (FIG. 5) (CPU 20 which performs the OSPF processing (FIG. 3A)) at the time of calculation of a detour route. The specific processing at the detour-route generating processing 56 will be described below.

Figure 9:
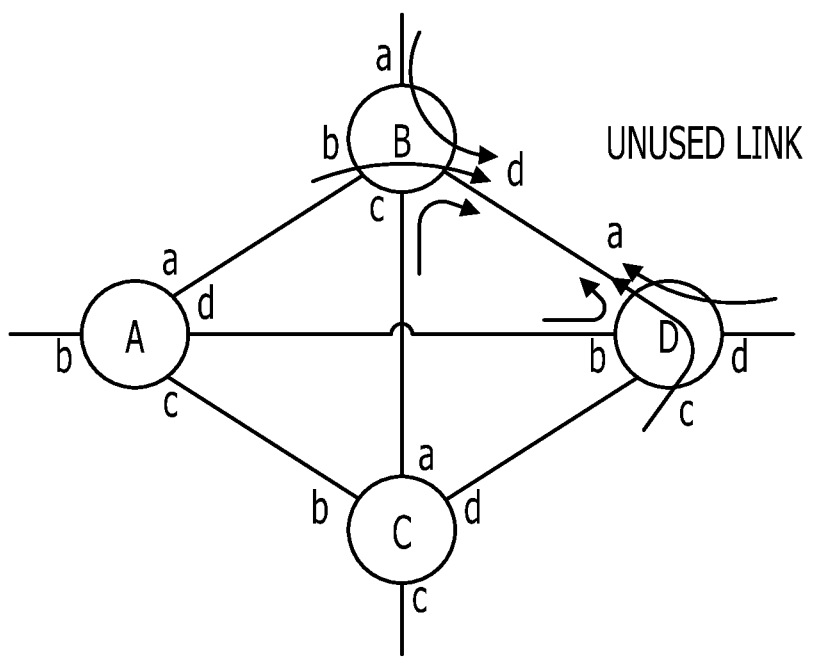
FIG. 9 is a diagram illustrating a path setting pattern according to an unused link (link B-D) in the network illustrated in FIG. 8.

FIG. 9 is a diagram illustrating path setting patterns according to the unused link (link B-D) in the network illustrated in FIG. 8. As illustrated in FIG. 9, the nodes A through D include ports a, b, c, and d, respectively. As path setting patterns that pass through the link B-D from the node B, there are a path setting pattern that inputs from a port B-a of the node B and outputs from a port B-d, a path setting pattern that inputs from a port B-b and outputs from the port B-d, and a path setting pattern that inputs from a port B-c and outputs from the port B-d. As path setting patterns that passes through the link B-D from the opposed node D, there are a path setting pattern that inputs from a port D-b and outputs from a port D-a, a path setting pattern that inputs from a port D-c and outputs from the port D-a, and a path setting pattern that inputs from a port D-d and outputs from the port D-a.

With the detour-route generating processing 56 of the node B, determination is made that a detour route that bypasses the unused link B-D is calculated regarding the paths that flow into the port B-d corresponding to the unused link B-D from the ports B-a, B-b, and B-c in the own node, respectively. With the detour-route generating processing 56, a condition that the ports B-a, B-b, and B-c are taken as start points, and the port D-d is taken as a terminal point, and also the port B-d corresponding to the unused link B-D is not passed through is input to the OSPF processing 55. Thus, a detour route is calculated with the OSPF processing 55.

Note that, with the above description, the port D-d is taken as a terminal point, but the terminal point is not restricted to this. The terminal point has to be a port of a node opposed to the own node in the unused link, and also a port not corresponding to this unused link. With the example in FIG. 9, the terminal point may be any of the ports D-b, D-c, and D-d other than the port D-a corresponding to the unused link. A detour route has been calculated with the port D-d alone being taken as the terminal point, but the calculation method is not restricted to this, and an arrangement may be made wherein multiple terminal points are set in the same way as with the start points, and a detour route is calculated regarding all of the combinations of the start points and terminal points.

With the OSPF processing 55, under the condition that the ports B-a, B-b, and B-c specified as the results of the detour-route generating processing 56 are taken as start points, the port D-d is taken as the terminal point, and also the port B-d is not passed through, detour routes from the start points to the terminal point are calculated. With the OSPF processing 55, for example, a detour route regarding a path setting pattern that flows into the port B-d from the port B-a, i.e., as a detour route with the port B-a being taken as a start point, detour routes passing through the port B-c, C-a, C-d, and D-c is calculated. With the OSPF processing 55, similarly, detour routes are calculated regarding a path setting pattern that flows into the port B-d from the port B-b, and a path setting pattern that flows into the port B-d from the port B-c, respectively.

Now, returning to FIG. 6, where with the detour-route generating processing 56, confirmation is made regarding whether or not detour routes have been calculated regarding all of the path setting patterns that pass through the unused link from the own node B by the OSPF processing 55 (S4). In the case that, with the own node B, detour routes have not been calculated regarding all of the path setting patterns that pass through the unused link from the own node B (S4; No), the present detour route generation and route outage flow is ended. In the case that detour routes have been calculated regarding all of the path setting patterns that pass through the unused link from the own node B (S4; Yes), with the detour-route generating processing 56, control data indicating that all of the detour routes to the opposed node D according to this unused link B-D have been calculated is informed.

With the opposed node D according to the unused link B-D as well, upon receiving the power supply off request from the monitoring control device 18, in the same way as with the node B, calculation of detour routes regarding the unused link B-D is performed. With the detour-route generating processing 56 within the node B, control data indicating the detour-route calculation results in the opposed node D is received from the opposed node D in this unused link B-D. With the detour-route generating processing 56 within the node B, according to the received control data, confirmation is made regarding whether or not all of the detour routes as to this unused link B-D have been calculated with this opposed node D (S5). With the opposed node D, in the case that detour routes have not been calculated regarding all of the path setting patterns that pass this unused link from the node D (S5; No), the present detour route generation and route outage flow is ended. With the opposed node D, in the case that detour routes have been calculated regarding all of the path setting patterns that pass this unused link from the node D (S5; Yes), with the detour-route generating processing 56 within the node B, the detour routing information calculated in S3 is stored (S6). Specifically, with the detour-route generating processing 56, the detour routing information calculated in S3 by the OSPF processing 55 is stored in the detour routing information DB 35.

FIG. 10 is a diagram illustrating a data configuration example of the detour routing information to be stored in the detour routing information DB 35 of the node B (FIGS. 3A and 3B). As illustrated in FIG. 10, a table made up of one or more records indicating the detour route corresponding to a path setting pattern is stored in the detour routing information DB 35.

The path setting patterns are identified by port identifiers (port ID) indicating an upstream port and an downstream port. The upstream port is, at the time of calculating a detour route, a port serving as the start point of the detour route, and is another port in the same node as with the port connected to an unused link requested for power supply off. The downstream port is a port connected to the unused link requested for power supply off, and is a port conditioned as a port that the detour route does not pass through at the time of calculating a detour route. The identifiers (ID) of ports which a detour route calculated with the upstream port serving as a start point passes through to the end point are stored in the detour route in accordance with the passage order. Each row in FIG. 10 represents detour routing information as to each of the path setting patterns according to the unused link of the node B.

Note that there are four detour-route ports under the premises that the nodes A through D exemplified in FIG. 7 are mesh-connected, but the number of ports included in a detour route fluctuates according to the number of nodes and connection mode. With the entries in the detour routing information DB 35, in addition to the items indicated in FIG. 10, information for identifying the record of each row, e.g., an item such as a number indicating a row number or the like, or cost of a detour route, or the like may be included.

Now, returning to FIG. 6, where in S6, with the detour-route generating processing 56, as indicated in FIG. 10, information of a detour route as to each start point and terminal point, i.e., information of each port which the detour route passes through is stored in the detour routing information DB 35. For example, with the detour-route generating processing 56, as detour routing information as to the start point B-a and the terminal point B-d, a detour-route port 1: B-c, a detour-route port 2: C-a, a detour-route port 3: C-d, and a detour-route port 4: D-c are stored in the detour routing information DB 35.

With the detour-route generating processing 56, after storing the detour routing information, the power supply driving circuit 59 of the own node is instructed to power off of the IF card/port corresponding to the unused link B-D (S7). Thus, the power supply driving circuit 59 turns off power supply to the IF card/port corresponding to the link B-D (S7). As indicated in S3 through S7, both end nodes of a link to be powered off turn off power feeding to the IF card/port after confirming that the detour routing information has been created at both nodes.

Upon power feeding to the IF card/port corresponding to the unused link in S7 going off, the detour-route generation and route outage flow illustrated in FIG. 6 is ended.

The IF card/port powered off in S7 is determined to be a failure by the card monitoring processing 53, and the effect thereof is informed at the time of performing the detour failure band monitoring processing 58 (FIG. 5) (detour failure band monitoring circuit 33 (FIG. 3A)). With the detour failure band monitoring processing 58, determination is made that the IF card/port determined to be a failure by the card monitoring processing 53 corresponds to the power supply off link, by reference the detour routing information DB 35. That is to say, with the detour failure band monitoring processing 58, this IF card/port can determine that the power supply has not been turned off due to occurrence of a failure. Thus, with the detour failure band monitoring processing 58, at the time of performing the OSPF processing 55, notification to the effect that a failure occurs on this IF card/port is not performed. That is to say, with the detour failure band monitoring processing 58, at the time of performing the OSPF processing 55, the power supply off state of this IF card/port is not informed. With the OSPF processing 55, there is no failure state to be reflected on the LSDB 27, and accordingly, even if the power supply of the IF card/port corresponding to an unused link has been turned off, the same information as with before turning off the power supply is stored in the LSDB 27. Thus, it is not informed to another node over the network 10 that the IF card/port corresponding to the unused link has been powered off.

Thus, even in the event that an existing node is coexist on the network 10, the existing node can operate as usual without regard to the power supply off link. For example, control data from the node 1 according to the present first embodiment to an existing node, and control data from an existing node to the node 1 are as usual. Accordingly, the node 1 according to the present first embodiment may be introduced into a portion of the network 10 (MPLS/GMPLS network). Therefore, introduction of an energy saving technique to the network can readily be performed. However, in the case of introducing the node 1 into a portion of the network 10, it is desirable to dispose the nodes 1 in a section where power supply off control is intended in an opposed manner. In the case of disposing an existing node and the node 1 in an opposed manner, power supply off control after confirmation of a detour route as illustrated in FIG. 6 is failed to be performed.

Note that, with Operation Example 1-1, in S5 in FIG. 6, with the detour-route generating processing 56 within the node B, confirmation is made regarding whether or not detour routes have been calculated regarding all of the path setting patterns that can pass through an unused link from the node D at the opposed node D according to the unused link. As a result of confirmation, in the case that detour routes have not been calculated regarding all of the path setting patterns that can pass through the unused link from the node D at the opposed node D (S5; No), the function of the unused link is not stopped. However, the present embodiment is not restricted to this, and confirmation processing in S5 may not be performed. Specifically, an arrangement may be made wherein upon detour routes having been calculated regarding all of the path setting patterns that can pass through the unused link from the own node B at the own node B (S4; Yes), the flow proceeds to S6 and S7, and the detour routes are stored, and power feeding to the unused port according to the unused link is turned off.

Though the operation example has been described so far regarding the node 1 (node B) which has received a power supply off request by the monitoring control device 18, the same processing as with the node B described above is performed at the node D which has received a power supply off request. With Operation Example 1, a power supply off request as to a node has been assumed to be instructed by the monitoring control device 18, but the instruction originator is not restricted to this, and a node in which processing for integrating the network 10 is embedded may autonomously instruct a power off supply path.

Also, S4 and S5 illustrated in FIG. 6 are in no particular order. Further, as for mutual communication according to control data between nodes, either InBand communication or OutBand communication may be employed.

In this way, under the condition that detour routes as to at least all of the path setting patterns relating to an object section are obtained, the power supply as to this section is turned off, whereby a section where the power supply is failed to be turned off since there is no alternative path for data transmission can be suppressed from a situation where data transmission is failed to be performed by the power supply being accidentally turned off.

Operation Example 1-2

Next, description will be made regarding operation of a node when a path opening request for setting a new path including a power supply off link (section (link) of which the power supply has been turned off by the processing in FIG. 6) at the network 10.

Figure 11:
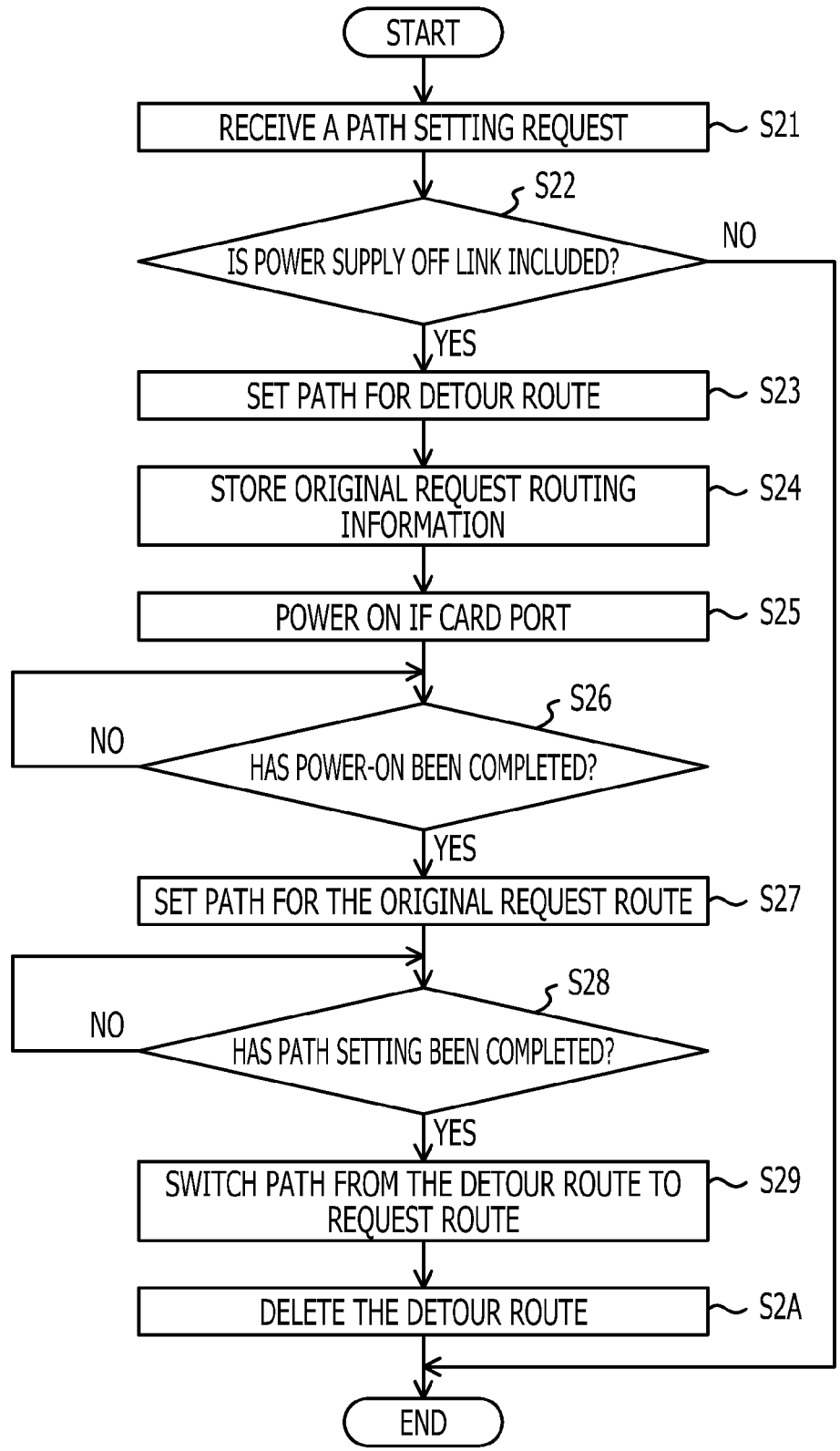
FIG. 11 is a diagram illustrating an example of a power off link activation flow according to the first embodiment.

FIG. 11 is a diagram illustrating an example of a power supply off link activation flow according to the first embodiment. FIG. 11 illustrates operation in the event that the node 1 connected to a power supply off link has received a path setting request regarding a new path including the power supply off link. Before describing this flow, description will be made below regarding operation until the node 1 of the network 10 receives a new path opening request, and a node connected to a power supply off link receives the corresponding path setting request.

Figure 12:
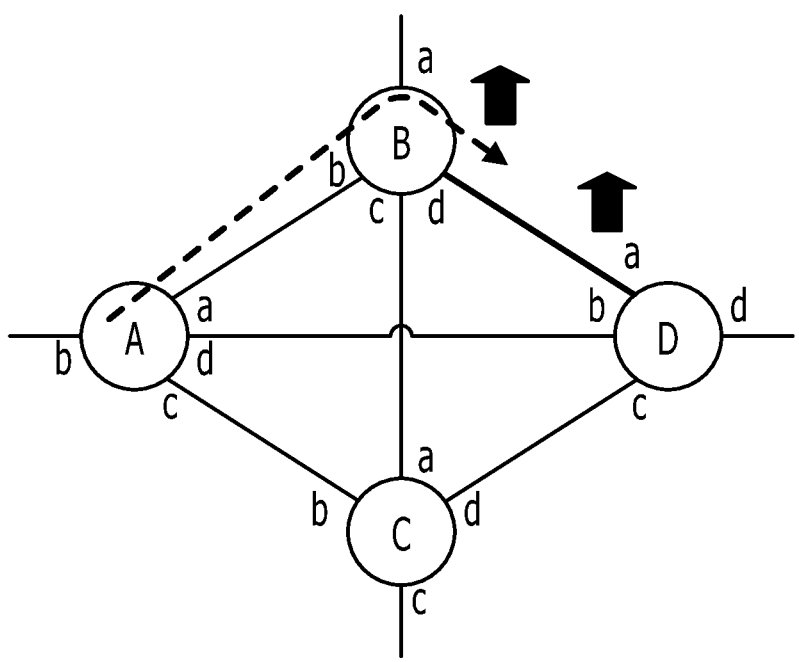
FIG. 12 is an explanation diagram of Operation Example 1-2.
Figure 13:
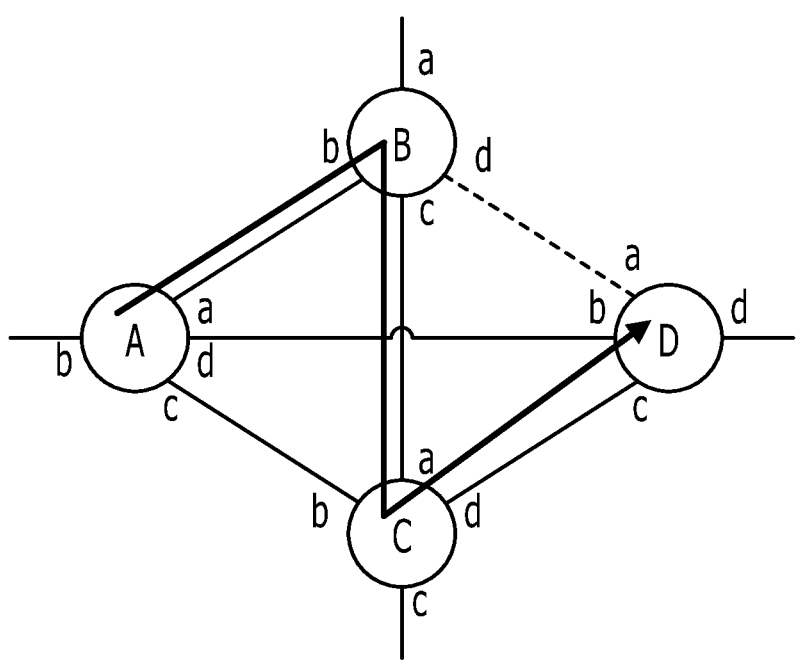
FIG. 13 is an explanatory diagram of Operation Example 1-2.

FIGS. 12 and 13 are explanatory diagrams of Operation Example 1-2. FIG. 12 illustrates a portion of the network 10 illustrated in FIG. 7, and it is assumed that power supply off according to the link B-D has been carried out. The node A receives control data that is a new path opening request from the monitoring control device 18. The path opening request includes specifications of a start point (node A) and a terminal point (node D) for a path. With the command analysis processing 51 (FIG. 5) (command analysis circuit 21 (FIG. 3A)) within the node A which has received a path opening request, the path opening request is analyzed. With the command analysis processing 51, after execution of analysis, the OSPF processing 55 (FIG. 5) (CPU 20 (FIG. 3A) which performs the OSPF processing) is instructed to calculate the shortest path from the start point (node A) to the terminal point (node D) set in the path opening request. Thus, the shortest path is calculated by the OSPF processing 55.

With the present Operation Example 1-2, the shortest path calculated by the OSPF processing 55 includes a power supply off link (link B-D) where the function has been stopped for energy saving. Here, with the OSPF processing 55, as illustrated in FIG. 12, for example, let us assume that a path that passes through the port A-a, port B-b, port B-d, and port D-a, i.e., a path A-B-D has been calculated as the shortest path. Note that in the case of the path A-B-D directing from the start point A to the terminal point D, with regard to the power supply off link B-D, the node B may be referred to as the upstream node, and the node D may be referred to as the downstream node.

Upon the shortest path as to a new path opening request being calculated by the OSPF processing 55 within the node A, a new path setting request (Path Message) for setting this shortest path is transmitted to the node B which is an adjacent node on the shortest path by the RSVP processing 54 (FIG. 5) (CPU 20 which performs the RSVP processing (FIG. 3A)) within the node A. Thus, the node B starts processing illustrated in FIG. 11.

With the detour-route determining processing 57 (FIG. 5) (detour-route determining circuit 32 (FIG. 3A)) of the node B, control data that is a new path setting request (Path Message) for setting the shortest path as to the new path opening request is received by the node A (S21). With the detour-route determining processing 57 within the node B, determination is made regarding whether or not the route of the new path indicated by the path setting request includes a power supply off link, with reference to the detour routing information DB 35 (S22). The entry of a path setting pattern including the path (B-b, B-d) specified by the path setting request is registered in the detour routing information DB 35 (FIG. 10). Therefore, information of the power supply off link can be obtained by referencing the detour routing information DB 35. For example, with the detour routing determining processing 57, confirmation is made regarding whether or not a path setting pattern (combination between the upstream port and the downstream port) stored in the detour routing information DB 35 is included in the ports A-a, B-b, B-d, and D-a of the new path included in the path setting request. The path specified by the path setting request corresponds to a path setting pattern registered in the detour routing information DB 35. Thus, with the detour-route determining processing 57, determination can be made that the power supply off link is included in the path setting request.

As a result of the determination in S22, in the case that no power supply off link is included in the path setting request (S22; No), the power supply off link activation flow illustrated in FIG. 11 is ended, and the node B performs the path setting procedure as usual. On the other hand, in the case that a power supply off link is included (S22; Yes), with the detour-route determining processing 57, a path including a detour route that bypasses this power supply off link (detour path) is opened (S23). With the detour-route determining processing 57, the detour routing information extracted from the detour routing information DB 35 is transferred to the RSVP processing 54 (S23). With the RSVP processing 54, a portion of a request route within the path setting request is rewritten in accordance with the detour routing information, and the path setting request (Path Message) is transmitted from the port equivalent to the detour route (port B-c) (S23). Thus, the path setting request is transferred to the node C by bypassing the power supply off link.

As illustrated in FIG. 13, the path setting request reaches the node D via the node C in accordance with the detour routing information. Thereafter, a reply message is generated by the node D, the reply message traces the inverse path, i.e., the node C, and node B and reaches the node A. In this way, the path that bypasses the power supply off section is established.

With the detour-route determining processing 57 of the node B, the card setting processing 52 (FIG. 5) (card setting circuit 22 (FIG. 3A) is instructed to perform the hardware setting of the card within the own node to open the path. With the card setting processing 52, hardware setting is performed on the IF card and SW card corresponding to the port of the own node which the detour route passes through so as to open this detour route. With the example in FIG. 13, with the card setting processing 52 within the node B, hardware setting is performed on the IF card and SW card corresponding to the ports B-b and B-c of the own node which the detour route passes through.

With the detour-route determining processing 57, information of a new path included in a new path setting request corresponding to a new path opening request, i.e., information of the original request route is stored in the request routing information DB 36 (S24).

FIG. 14 is a diagram illustrating a data configuration example of request routing information to be stored in the request routing information DB 36 according to the first embodiment (FIGS. 3A and 3B). Each row in FIG. 14 represents each piece of request routing information. As illustrated in FIG. 14, the items of request route ports 1 through 4 are included in each row of the request routing information DB 36. The request route ports 1 through 4 indicate ports which the original request route passes through included in a new path setting request in order.

Note that, with the example in FIG. 14, in the light of the network configuration illustrated in FIG. 7, an example is illustrated wherein the port identifiers of four ports are registered, but the identifiers of all of the ports which a path to be set passes through are registered. Accordingly, the number of port identifiers to be registered fluctuates according to the number of nodes which the path passes through.

Now, returning to FIG. 11, in S24, with the detour-route determining processing 57, as illustrated in FIG. 14, information of each port which the original request route included in a new path setting request passes through is stored in the request routing information DB 36. For example, with the detour route determining processing 57, the request route port 1: A-a, request route port 2: B-b, request route port 3: B-d, and request route port 4: D-a are stored in the request routing information DB 36 as request routing information included in a new path setting request.

Further, with the detour-route determining processing 57 within the node B, the power supply driving circuit 59 (FIG. 5) (power supply driving circuit 6 (FIG. 3A)) is instructed to power on the IF card/port corresponding to the power supply off link B-D within the own node, i.e., the IF card/port corresponding to the port B-d (S25). Thus, power supply of the IF card/port corresponding to the port B-d is turned on by the power supply driving circuit 59 (S25). With the detour-route determining processing 57 within the node B, control data indicating that power supply of the IF card/port corresponding to the port B-d has been turned on is informed to the node D by InBand or OutBand communication.

With the command analysis processing 51 of the node D which has received this control data, this control data is analyzed, and it is informed to the detour-route determining processing 57 that power supply of the IF card/port corresponding to the port B-d has been turned on. With the detour-route determining processing 57, the port of the own node connected to the port B-d is determined to be the port D-a by referencing information stored in the LSDB 27. Specifically, with the detour-route determining processing 57 of the node D, the opposed node ID and opposed link ID of a record where the node ID and link ID of the LSDB 27 become the port B-d is the port D-a, and accordingly, the port connected to the port B-d is determined to be the port D-a. With the detour-route determining processing 57 of the node D, the power supply driving circuit 59 is instructed to power on the IF card/port corresponding to the determined port D-a. The power supply driving circuit 59 powers on the IF card/port corresponding to the port D-a. With the detour-route determining processing 57 within the node D, transmits control data indicating that power supply of the IF card/port corresponding to the port D-a has been turned on, to the node B.

With the detour failure band monitoring processing 58 (FIG. 5) (detour failure band monitoring circuit 33 (FIG. 3A)) within the node B, confirmation is made that the power supply off link B-D has been successfully activated (S26). Note that "the power supply off link has been successfully activated" means "the power supply off link becomes a state in which communication data can be successfully transmitted" by power supply to the port corresponding to the power supply off link being started. That is to say, "the power supply off link has been successfully activated" means "the power supply off link becomes a state in which data transfer is successfully performed".

In S26, with the detour failure band monitoring processing 58 within the node B, at the time of restoration from a failure state of the hardware of the IF card/port corresponding to the power supply off link B-D being detected, the power supply off link B-D is determined to have been successfully activated. Specifically, with the detour failure band monitoring processing 58, it is detected that the port B-d within the own node B according to the power supply off link B-D, and the port D-a within the opposed node D according to the power supply off link B-D have been restored from a power off state (failure state). With the detour failure band monitoring processing 58, at the time of confirming that the ports B-d and D-a have been restored from a failure state, determination is made that the power supply off link B-D has been successfully activated.

Note that, with the detour failure band monitoring processing 58, it is informed by the card monitoring processing 53 (FIG. 5) (card monitoring circuit 23 (FIG. 3A)) within the node B wherein the IF card is monitored that the IF card/port corresponding to the port B-d has been restored from a failure state, whereby detection of this restoration can be performed.

Figure 15:
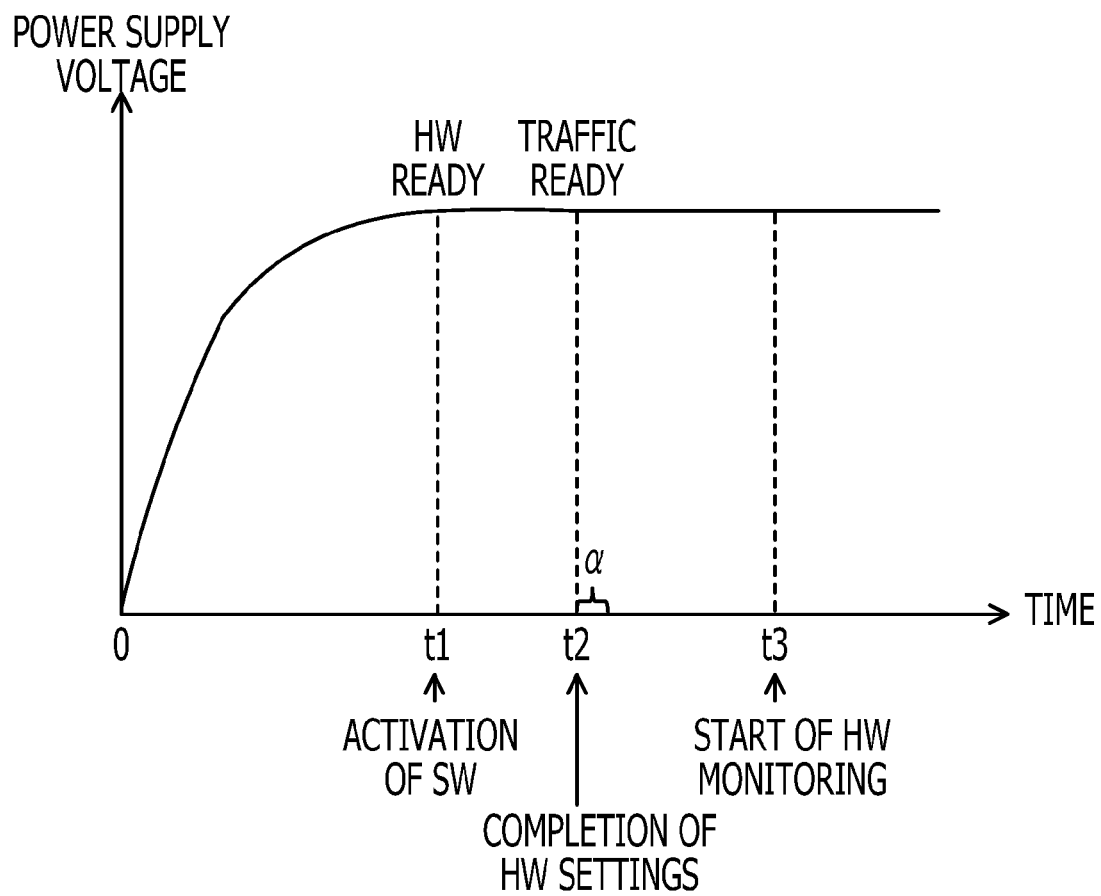
FIG. 15 is a diagram illustrating an example of relationship between the power supply voltage and time of an IF card port according to the first embodiment.

FIG. 15 is a diagram illustrating an example of relationship between power supply voltage of the IF card/port according to the first embodiment and time. FIG. 15 is a graph wherein the vertical axis is taken as the power supply voltage of the IF card/port, and the horizontal axis is taken as time, and illustrates time change of the power supply voltage of the IF card/port at the time of the IF card/port being powered on. At the time of time t=0, the power supply of the IF card/port is powered on. At time t1, the hardware (hereafter, referred to as "HW") of the IF card becomes a state entirely activated (Hereafter, referred to as "HW Ready"). Thus, software of the IF card (hereafter, referred to as "SW") is activated. At time t2, setting of the HW becomes a completed state by the SW having been activated, and becomes a state in which data can be transmitted (hereafter, referred to as "traffic ready"). In a traffic ready state, at time t3, monitoring regarding the hardware of the IF card is started. Note that warm-up time and configuration time of the hardware of the IF card elapse until time t3 elapses.

According to the example illustrated in FIG. 15, with the card monitoring processing 53, monitoring of the HW of the IF card is started at time t3, and restoration of the IF card/port is confirmed by confirming that no failure occurs on the HW, e.g., that information stored in the hardware failure register indicates "without failure". Note that, for example, with the car monitoring processing 53, monitoring of the HW of the IF card is performed by polling the value ("0"/"1") of the hardware failure register within the IF card to confirm whether or not a failure has occurred on the HW. In this case, with the card monitoring processing 53, for example, when detecting that the value of the hardware failure register has changed from "1" with a failure to "0" without failure, the IF card/port is determined to have been restored.

In this way, with the detour failure band monitoring processing 58, upon confirming that the port B-d has been restored from a failure state by notification by the card monitoring processing 53, it is informed to the detour-route generating processing 56 that the port B-d has been restored. With the detour-route generating processing 56, it is informed to the opposed node D of the restored port B-d by control data that the port B-d has been restored.

Note that, with the opposed node D as well, restoration of the port D-a is confirmed in the same procedure as with the node B. With the opposed node D, in the case that the IF card/port corresponding to the port D-a has been restored from a failure state, i.e., in the case that the port D-a has been restored, restoration of the port D-a is informed to the node B by control data. With the detour failure band monitoring processing 58 within the node B, this control data is received, whereby it can be confirmed that the IF card/port corresponding to the port D-a has been restored from a failure state, i.e., restoration of the port D-a can be confirmed. Note that, with the detour failure band monitoring processing 58 within the node B, this control data may be received via the command analysis processing 51. In this way, with the detour failure band monitoring processing 58 within the node B, the power supply off link B-D is determined to have been successfully activated by the IF card/port corresponding to the power supply off link being restored.

The detour failure band monitoring processing 58 stands by until confirmation is made that the power supply off link B-D has been successfully activated. In the case that confirmation is made that the power supply off link B-D has been successfully activated (S26; Yes), the detour failure band monitoring processing 58 proceeds to processing in S27.

In S27, with the detour-route generating processing 56 (FIG. 5) (detour-route generating circuit 31 (FIG. 3A)), the request routing information (FIG. 14) recorded in S24 is read out from the request routing information DB 36, and path setting request is performed regarding this request route (S27). Specifically, with the detour-route generating processing 56, the read request routing information is output to the RSVP processing 54, and with the RSVP processing 54, the path setting request including this request routing information is transmitted to the next node (node D) on the request route. This path setting request reaches the node D through the link B-D that has been a power supply off link.

The detour-route generating processing 56 stands by for reception of a reply message corresponding to the path setting request (S28). Upon confirming completion of path setting for the request route by receiving the reply message (S28; Yes), the detour-route generating processing 56 proceeds to processing in S29.

In S29, with the detour-route generating processing 56, the card setting processing 52 is instructed to switch the path for transmitting communication data from the detour route to the request route. Specifically, with the detour-route generating processing 56, it is instructed to switch the detour path to a path including a power supply off link, requested for setting from a path setting request. Thus, with the card setting processing 52, the path for transmitting communication data is switched from the detour route to the request route (S29). That is to say, with the card setting processing 52, correspondence relationship between the input side label and the output side label is changed so as to output data received from the port B-b not from the port B-c which is the detour route but from the port B-d which is the request route.

Figure 16:
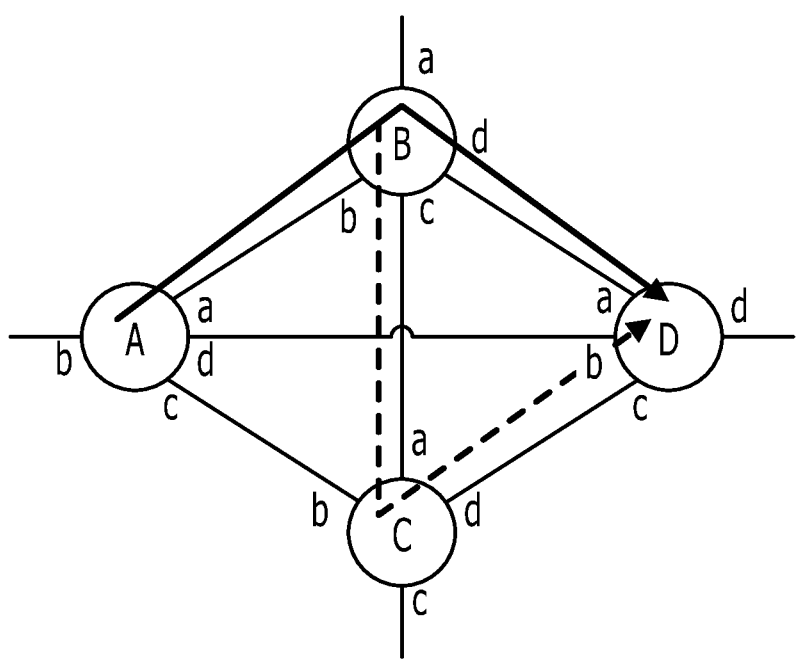
FIG. 16 is an explanatory diagram of path switching and detour-route deletion.
Figure 17:
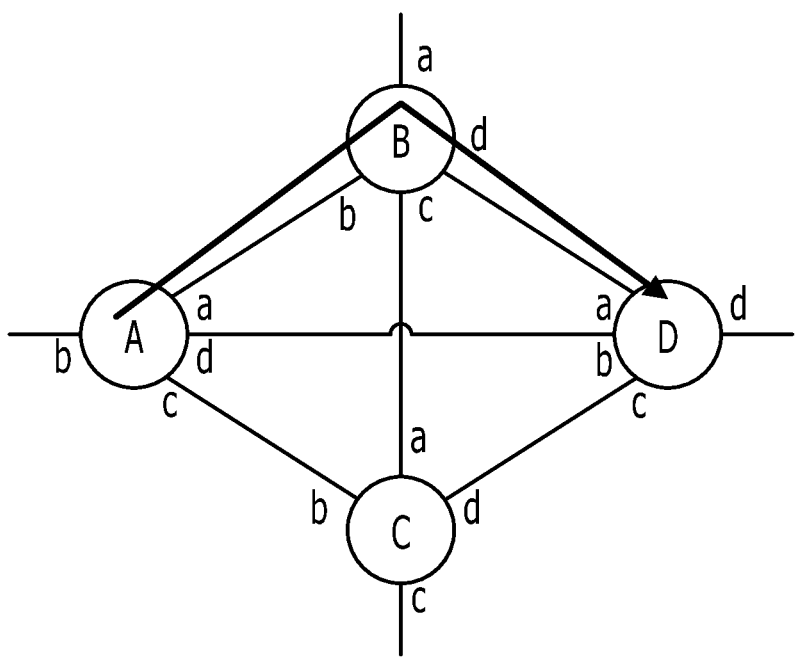
FIG. 17 is an explanatory diagram of path switching and detour-route deletion.

FIGS. 16 and 17 are explanatory diagrams of path switching and detour route deletion. In FIG. 16, a detour route is indicated with a dotted line, and a request route is indicated with a solid line. According to the example in FIG. 16, with the card setting processing 52, a path where communication data is transferred is switched from the detour route that passes through the ports A-a, B-b, B-c, C-a, C-d, and D-c to the request route that passes through the ports A-a, B-b, B-d, and D-a.

Upon switching of the path for transmitting communication data being completed in S29, with the detour-route generating processing 56 within the node B, a path that passes through the ports B-c, C-a, and D-c serving as the detour route which became unnecessary, is deleted (S2A). Specifically, with the detour-route generating processing 56, the RSVP processing 54 is instructed to output information of the ports B-c, C-a, and D-c of the detour route which became unnecessary and to transmit a path setting request for deleting the detour route to the next node (node C) of the detour route. This path setting request is sequentially transmitted to the node C, and node D on the detour route, and accordingly, this detour route is deleted.

As illustrated in FIG. 17, according to the detour-route generating processing 56 within the node B, the path that passes through the ports B-c, C-a, and D-c serving as the detour route which became unnecessary is deleted. Thus, only the path that passes through the ports A-a, B-b, B-d, and D-a which is the request route is opened.

With the processing in S2A illustrated in FIG. 11, the detour routing information stored in S6 in FIG. 6 regarding this power supply off link included in the request route is deleted from the detour routing information DB 35.

Note that operations in S29 and S2A in the flow in FIG. 11 are the same as the operations of Make before break serving as an existing technique. Make before break is a method wherein a new path for changing the route of a path before deleting (cutting) an already opened (set) path is set, and after setting of this new path, with the start point node of the path, traffic is shifted from the existing path to the new path. Note that, with Make before break, further, after traffic shift, the existing path is deleted (cut). Thus, the route of the path can be changed without being accompanied by service interruption.

Note that S23, S24, and S25 illustrated in FIG. 11 are in no particular order. For example, after powering on the IF card/port, path setting may be performed with a detour route. According to this method, time until data transmission of the request route is enabled after performing path setting can be reduced, whereby reduction in a time zone for transmitting data can be realized using a detour route. In particular, the greater distance difference between the detour route and the request route, this method is effective. As mutual communication according to control data between nodes, either InBand communication or OutBand communication may be employed.

With Operation Example 1-2, in S24 in FIG. 11, request routing information is assumed to be stored in the request routing information DB 36. However, after performing path setting regarding the request route using this request routing information, this request routing information is unnecessary, and accordingly, this request routing information may be deleted from the request routing information DB 36 in the subsequent step after S27. Note that deletion of this request routing information may be performed in the detour-route generating processing 56 or detour-route determining processing 57.

With the network 10, the operation of a node at the time of a path failure occurring will be described below with reference to the flowchart in FIG. 18 and the explanatory diagram of Operation Example 1-3 in FIG. 19.

Figure 18:
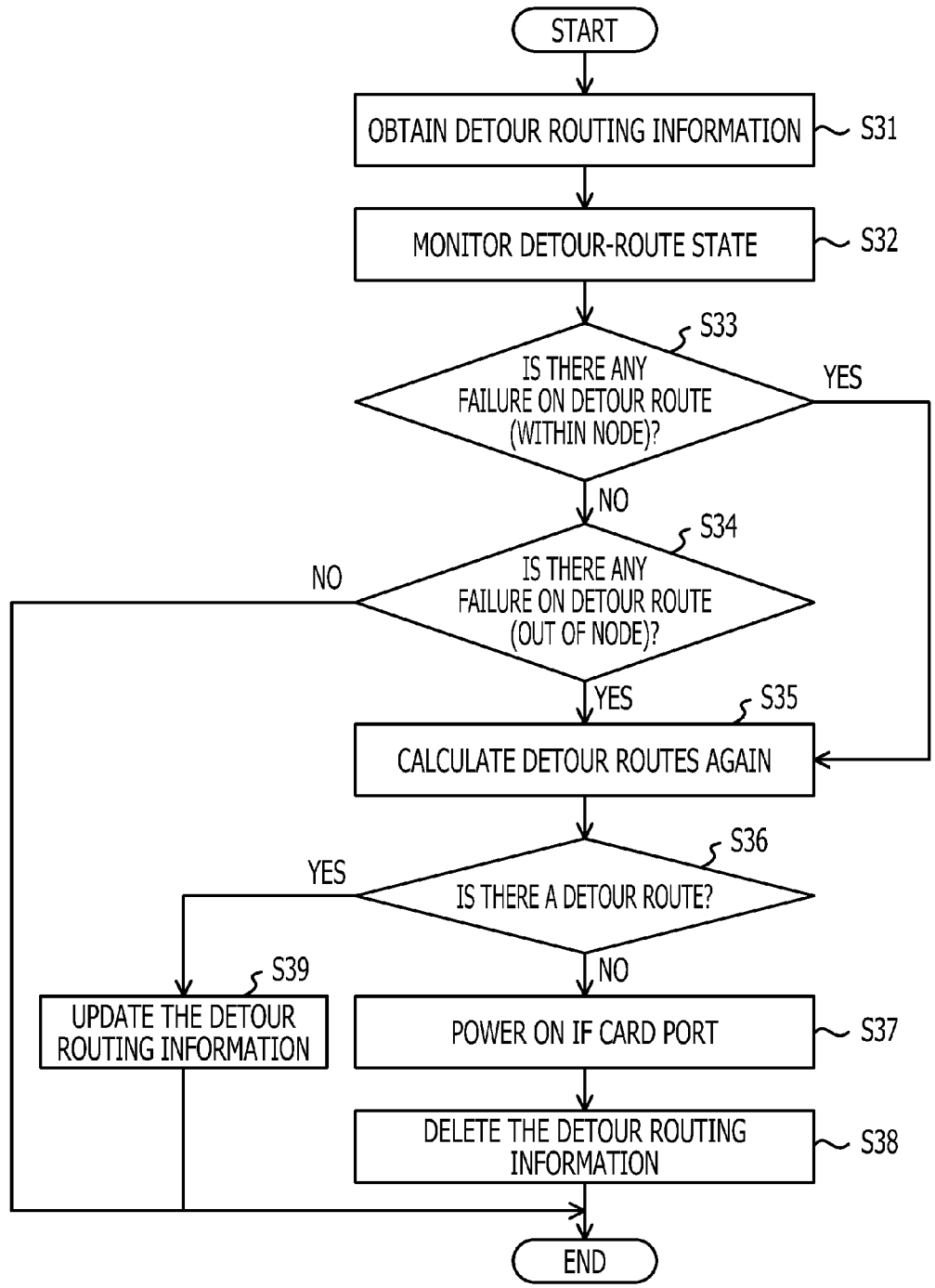
FIG. 18 is a diagram illustrating an example of a flow at the time of occurrence of a path failure according to the first embodiment.

FIG. 18 is a diagram illustrating an example of a flow at the time of occurrence of a path failure according to the first embodiment. FIG. 19 is the same as a portion of the network 10 illustrated in FIG. 7. The link B-D illustrated in FIG. 19 becomes a power supply off link by execution of the processing illustrated in FIG. 6.

The processing illustrated in FIG. 18 is periodically executed. Upon the processing in FIG. 18 being started, with the detour failure band monitoring processing 58 (FIG. 5) (detour failure band monitoring circuit 33 (FIG. 3A)) within the node B, the detour routing information (FIG. 10) stored in the detour routing information DB 35 is obtained (S31). With the detour failure band monitoring processing 58 in which the detour routing information has been obtained, the states of all of the detour routes indicated by this detour routing information, i.e., the states of the IF cards corresponding to the detour routes are monitored (S32). With the detour failure band monitoring processing 58, confirmation is made regarding whether or not a failure has occurred on a detour route within the own node (S33). A failure within a node can be detected by the card monitoring processing 53 (FIG. 5) (card monitoring circuit 23 (FIG. 3A)). Therefore, with the detour failure band monitoring processing 58, as a result of the card monitoring processing 53, it is informed that a failure has occurred on a link connected to the own node, and accordingly, it can be confirmed that a failure has occurred on this link.

With the detour failure band monitoring processing 58, in the case that occurrence of a failure within a node has been confirmed (S33; Yes), a failure of the detour route is informed to the detour-route generating processing 56 (FIG. 5) (detour-route generating circuit 31 (FIG. 3A)), and proceeds to recalculation processing of a detour route in S35. With the detour failure band monitoring processing 58, in the case that occurrence of a failure within a node has not been confirmed (S33; No), proceeds to processing in S34. In S34, with the detour failure band monitoring processing 58, confirmation is made regarding whether or not a failure has occurred on a detour route (link) out of the own node (S34). Here, a failure in a link not connected to the own node is failed to be detected by the card monitoring processing 53 within the own node. Therefore, with the detour failure band monitoring processing 58, a failure occurrence situation in a link not connected to the own node is confirmed by referencing the LSDB 27. Specifically, with the detour failure band monitoring processing 58, a record of the LSDB 27 corresponding to a link not connected to the own node is confirmed, and whether or not there is no available band is confirmed.

With the detour failure band monitoring processing 58, in the case that occurrence of a failure on the detour route has not been confirmed (S34; No), the present flow at the time of path failure occurrence is ended. With the detour failure band monitoring processing 58, in the case that occurrence of a failure has been confirmed (S34; Yes), with the detour failure band monitoring processing 58, a failure on the detour route is informed to the detour-route generating processing 56. In this way, with the detour failure band monitoring processing 58, the states of all of the detour routes that bypass an unused link connected to the own node are monitored, and in the case that there is a failure at least on one of a link connected to the own node and a link not connected to the own node, this failure is informed to the detour-route generating processing 56.

Figure 19:
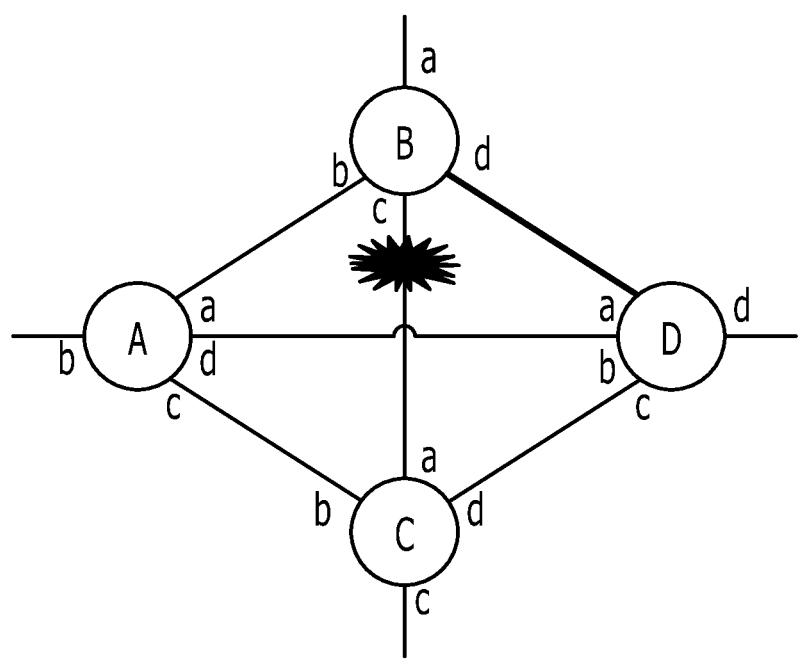
FIG. 19 is a diagram illustrating an example of a path failure.

FIG. 19 is a diagram illustrating an example of a path failure. As illustrated in FIG. 19, in the case that a failure has occurred on the link B-C, with the detour failure band monitoring processing 58 of the node B, in S33 it is confirmed that a failure on the link connected to the own node has occurred. Thus, with the detour failure band monitoring processing 58, it is informed to the detour-route generating processing 56 that a failure has occurred on the link B-C included in the detour route, i.e., the link between the port B-c and the port C-a.

With the detour-route generating processing 56 to which a failure of the detour route has been informed, with regard to this power supply off link, a detour route that does no pass through the link B-C where a failure has occurred is calculated (S35). Note that a detour-route calculating method to be performed in S35 is the same as the detour-route calculating method in S3 in FIG. 6, and accordingly, detailed description will be omitted. Note that, with the detour-route generating processing 56, in S35 a detour route is calculated under the condition that the detour route does not pass through the port B-c corresponding to the link where a failure has occurred in addition to the port B-d corresponding to the power supply off link.

With the detour-route generating processing 56, as a result of a detour route being calculated again, with the own node B, confirmation is made regarding whether or not a detour route that does not pass through the link B-C where a failure has occurred has been calculated regarding all of the path setting patterns that can pass through this power supply off link from the won node B (S36). With the example in FIG. 19, with the detour-route generating processing 56, a detour route is calculated regarding each path that flows into the downstream port B-d from the upstream ports B-a, B-b, and B-c. In the case of the upstream ports B-a and B-c, a detour route that passes through the ports B-b, A-a, A-d, and D-b is calculated as a detour route that does not pass through the ports B-d and B-c. However, in the case of the upstream port B-b, there is no detour route that does not pass through the ports B-d and B-c, and accordingly, no detour route is calculated.

In this way, in the case that a detour route that does not pass through the link B-C where a failure has occurred is not calculated regarding all of the path setting patterns that can pass through the power supply off link from the own node B (S36; No), with the detour-route generating processing 56, a power feeding stop state according to the power supply off link is determined to be unable to be kept. This is because there is no detour route for temporary detour, and accordingly, service interruption may be caused as to a path setting request including the power supply off link at the time of restoring the power supply off link. Therefore, with the detour-route generating processing 56, the power supply driving circuit 59 (FIG. 5) (power supply driving circuit 6 (FIG. 3A)) is instructed to power on the IF card/port corresponding to the port B-d of the power supply off link B-D (S37). With the detour-route generating processing 56, it is informed to the opposed node D of the power supply off link by control data that the IF card/port corresponding to the port B-d has been powered off. Note that, with the detour-route generating processing 56 of the node D in which this control data has been received, the power supply driving circuit 59 of the own node is instructed to power on the IF card/port corresponding to the pot D-a connected to the port B-d.

With the detour-route generating processing 56 within the node B, with regard to the power supply off link corresponding to the IF card/port powered on in S37, the detour routing information stored as to this power supply off link is deleted from the detour routing information DB 35 (S38). Upon this detour routing information being deleted in S38, the flow at the time of path failure occurrence in FIG. 18 is ended. Description will be returned to the description of the processing in S36.

In the case that a detour route that does not pass through the link B-C where a failure has occurred is calculated regarding all of the path setting patterns that can pass through the power supply off link from the own node B (S36; Yes), with the detour-route generating processing 56, the detour routing information DB 35 is updated with the detour routing information newly calculated in S35 (S39). That is to say, with the detour-route generating processing 56, the detour routing information stored in S6 in FIG. 6 is overwritten with the detour routing information recalculated in S35 in FIG. 18. Upon the detour routing information DB 35 being updated in S39, the flow at the time of path failure occurrence in FIG. 18 is ended.

In this way, in the event that a detour-route failure has occurred, another detour route is calculated, and in the event that another detour route has not been calculated, power supply as to an alternative section of a detour route is turned on, whereby a data transmission path can be secured even in the event that a failure has occurred on a detour route, and accordingly, influence of service interruption can be reduced.

The operation example regarding the node B connected to the power supply off link has been described so far, but with the node D connected to the power supply off link as well, the same processing as with the node B is performed. As illustrated in FIG. 19, in the event that a failure has occurred on the link between the ports B-c and C-a, this link is not connected to the node D, and accordingly, the node D detects this failure by referencing the LSDB 27 in S34.

Note that S33 and S34 illustrated in FIG. 18 are in no particular order. Note that as for mutual communication according to control data between nodes, either InBand communication or OutBand communication may be employed.

According to the above Operation Example 1, with the detour failure band monitoring processing 58, a failure occurrence situation in the detour route is assumed to be monitored, but the monitoring object is not restricted to this, and a depletion situation (use situation) of the band in the detour route may be monitored. With the detour failure band monitoring processing 58, the use situation of the band in the detour route is monitored, and in the event of determining that this band converges, this detour route is determined to be unusable. Thus, in the same way as with occurrence of a failure, detour-route recalculating method in S35 is performed. With the detour failure band monitoring processing 58, for example, in the case that the unused band (usable band) is equal or smaller than a predetermined threshold, or the use band is equal to or greater than a predetermined threshold, this band may be determined to have converged. In the case that a ratio between the unused band and a band used in link (all usable bands) is equal to or smaller than a predetermined threshold, or in the case that a ratio between the use band and all usable bands is equal to or greater than a predetermined threshold, this may be determined to be convergence. Note that, at the time of monitoring the band use situation of the detour route is monitored with the detour failure band monitoring processing 58, this can be monitored by obtaining the use situation (information) of the band from the LSDB 27. The use situation of the band in a link connected to the own node can be obtained with the card monitoring processing 53. Note that, with the detour failure band monitoring processing 58, both of the failure occurrence situation in the detour route and the depletion information of a band may be monitored.

According to the embodiment, the node 1 calculates and stores, with the detour-route generating processing 56, a detour route corresponding to all of the path setting patterns that can pass through the unused link before turning off power supply of the unused port according to the unused link. Therefore, information of the detour route that bypasses this unused link can be stored. Thus, at the time of activating the powered off port, based on the stored detour routing information, a path including the detour route (detour path) can be opened instead of a path including the power supply off link. Therefore, according to the embodiment, delay from the path setting request to path opening at the time of a path setting request including a power supply off section can be avoided. Thus, occurrence of service interruption can also be avoided. The node 1 can avoid delay from a path setting request to path opening, and accordingly, outage regarding an optional path, i.e., power supply of the port corresponding to this path can be turned off.

According to the embodiment, only in the case that confirmation can be made with the detour-route generating processing 56 that there is a detour route in both edge nodes of an unused link, the node 1 stores detour routing information, and performs outage of the unused link. Thus, in the case that, with at least one of both edge nodes, a detour route that bypasses the unused link is failed to be calculated, outage of this unused link can be suppressed from being performed. Accordingly, at the time of activating this unused link (power supply off link) subjected to outage, with both edge nodes of the power supply link, based on the stored detour routing information, a path including the detour route (detour path) can be opened instead of a path that passes through this power supply off link. Thus, delay from a path setting request to path opening at the time of a path setting request including the power supply off section can be avoided.

According to the embodiment, with the detour-route determining processing 57, the node 1 can determine whether or not a path has to be opened to the detour route by determining whether or not a power supply off link is included in a new path according to a new path setting request. With the detour-route determining processing 57, the node 1 opens a detour path before opening a new path determined to include a power supply off link. Thus, at the time of a path setting request including a power supply off section, delay from the path determining request to path opening can be avoided. With the detour-route determining processing 57, the node 1 performs path switching so as to open a new path including the power supply off link after the power supply off link is restored and to transmit data that flows into the detour route to the new path. Thus, service interruption that occurs at the time of performing path switching can be avoided.

According to the embodiment, with the detour failure band monitoring processing 58, the node 1 can recognize, by monitoring the state of a detour route that bypasses a power supply off link, whether or not the detour route that bypasses the power supply off link is normal. In the event that a failure within a detour route or the like has been detected by the detour failure band monitoring processing 58, another detour route is calculated at the detour-route generating processing 56, and accordingly, the normal detour route whereby data can be transmitted can be stored.

In the case that there is no detour route that does not pass through a section where a failure has been detected regarding a power supply off link, the node 1 activates, with the detour-route generating processing 56 the power supply off link, whereby the outage state of the power supply off link where there is no detour route can be kept from being maintained. That is to say, even with an unused link of which the function has been stopped since there was a detour route, thereafter, in the event that there has not been a detour route by a failure or the like occurring on this detour route, the outage state of this unused link is not maintained, and this unused link is activated. Thus, at the time of path setting request including a power supply off section, delay from the path setting request to path opening can be avoided.

With the detour failure band monitoring processing 58, in the event that power supply of an IF card/port according to an unused link has been turned off, the node 1 determines that this IF card/port corresponds to a power supply off link, and the power-off state of this IF card/port is suppressed from being informed to another node. Thus, even in the event that the unused link has been subjected to outage, the other nodes do not have to recognize this unused link being in an outage state. Thus, even in the event that an existing node and a node according to the embodiment coexist on the network, the existing node can operate as usual without recognizing a power supply off link. Accordingly, the node 1 according to the embodiment can be introduced into a portion of a network, and introduction of an energy saving technique to a network can readily be performed.

With the present embodiment (Operation Example 1-2), a method for detecting restoration from the failure state of the IF card/port has been exemplified in S26 in FIG. 11 as a method for confirming that the power supply off link B-D has been successfully activated with the detour failure band monitoring processing 58 within the node B. However, the present embodiment is not restricted to this method, and it may be confirmed by employing the following Method 1 or Method 2 that the power off supply link B-D has been successfully activated.

(Method 1: Stand by Time Until Successful Activation is Carried Out)

Method 1 is a method wherein determination (confirmation) is made that the power supply off link B-D has been successfully activated at the time of time until an IF card/port is successfully activated elapsing. Here, "an IF card/port is successfully activated" means that power supply of an IF card/port has been turned on, and setting of the HW of this IF card/port has been completed. The detour failure band monitoring processing 58 within the node B stands by time until power supply of the IF card/port corresponding to the power supply off link B-D is powered on, and this IF card/port is successfully activated. With the example in FIG. 15, the detour failure band monitoring processing 58 stands by time $t2+\alpha$ until setting of the HW is completed. $\alpha$ is a margin as to the time $t2$. Specifically, with the detour failure band monitoring processing 58, after the time $t2$ used for setting of the HW of the IF card/port being completed elapses, at the time of further time $\alpha$ worth elapsing, determination can be made that the IF card/port has been successfully activated.

Note that, with the opposed node D of the power supply off link as well, in the same way as with the node B, confirmation is made that the IF card/port has been successfully activated. Thus, with the detour failure band monitoring processing 58 within the node B, control data to the effect that the IF card/port corresponding to the power supply off link within the opposed node D has been successfully activated is received from the opposed node D. Thus, with the detour failure band monitoring processing 58 within the node B, it can be confirmed that the IF cards/ports corresponding to the own node and opposed node connecting to the power supply off link have been successfully activated respectively. In this way, with the detour failure band monitoring processing 58, the power supply off link B-D can be determined to have been successfully activated by confirming that the IF cards/ports corresponding to the power supply off link have been successfully activated. Note that, with the detour failure band monitoring processing 58, the power supply off link B-D can also be determined to have been successfully activated by confirming only successful activation of the IF card/port in the own node B without confirming successful activation of the IF card/port in the opposed node D.

(Method 2: Transmission of Control Data)

Method 2 is a method for determining (confirming) that the power supply off link B-D has been successfully activated by control data being successfully transmitted to the opposed node using the power supply off link B-D. With the detour failure band monitoring processing 58 within the node B, control data is transmitted to the opposed node D according to the power supply off link. With the detour failure band monitoring processing 58 within the node B, it can be determined that the power supply off link B-D has been successfully activated, at the time of confirming that this control data has been successfully transmitted. Also, without restricting to this, with the detour failure band monitoring processing 58 within the node B, it can also be determined that the power supply off link B-D has been successfully activated, at the time of receiving, from the node D which has received control data, reply data to the effect that this control data has been successfully received. According to the example in FIG. 15, with the detour failure band monitoring processing 58, after setting of the HW is completed at the time t2, it is confirmed that the control data has been successfully transmitted or received. Note that it can also be determined that the power supply off link B-D has been successfully activated by both edge nodes of the power supply off link B-D each transmitting the control data to the opposed node, and each control data being successfully received at the opposed node. With the detour failure band monitoring processing 58, another processing may be instructed to perform transmission of the control data as to the opposed node D. In this way, with the detour failure band monitoring processing 58, it can be determined that the power supply off link B-D has been successfully activated, by the control data that passes through the power supply off link being successfully transmitted/received.

With the present embodiment (Operation Example 1-2), it has been informed to the node D using control data that power supply of the IF card/port corresponding to the port B-d of the node B has been turned on, but the tool to be informed is not restricted to this. For example, information indicating that power supply of the IF card/port corresponding to the port B-d has been turned on may be included in a path setting request regarding a detour route to be transmitted from the port B to the port D.

In this case, with the flow in FIG. 11, the order of S23 and S25 to be performed is switched. Specifically, upon the path setting request being determined to include the power supply off link in S22 in FIG. 11 (S22; Yes), processing in S25 is performed. In S25, as illustrated in Operation Example 1-2, the IF card/port corresponding to the port B-d is powered on by the power supply driving circuit 59. Upon the IF card/port corresponding to the port B-d being powered on in S25, in S24 the request routing information is recorded. Upon the request routing information being recorded in S24, in S23 a path setting request being transmitted from the node B to the node D regarding the detour route by the RSVP processing 54. With the RSVP processing 54, in S25 it is informed that the IF card/port corresponding to the port B-d has been powered on directly from the power supply driving circuit 59 or via the detour-route determining processing 57. Thus, with the RSVP processing 54, in S23 a path setting request in which information indicating that the IF card/port corresponding to the port B-d has been powered on is included is transmitted.

With the node D which has received the path setting request, it can be recognized that the IF card/port corresponding to the port B-d of the node B has been powered on by extracting the above-mentioned information included in the path setting request with the RSVP processing 54, command analysis processing 51, or detour-route determining processing 57. Note that S24 in FIG. 11 may be executed before S25, or may be executed after S23. Also, S25 may be executed before S23.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device configured to establish a path for data transmission, comprising:
   a calculation circuit configured to calculate a detour route of respective path setting patterns including a section and the communication device located at an edge of the section;
   a memory configured to store detour routing information including detour routes calculated by the calculation circuit;
   a power supply driving circuit configured to turn off power supply to the section, when detour routes related to all of the path setting patterns are obtained; and
   a setting circuit configured to:
      receive a request for opening a new path, the request including specifications of a start point and a terminal point of the new path,
      specify a detour route bypassing the section using the detour routing information, a usable band of the detour route to be specified as being greater than a predetermined threshold, when determining that the new path includes the section,
      open a detour path including the detour route and the terminal point, by transmitting the request to the terminal point using the specified detour route and receiving a response message generated at the terminal point in response to the request via the specified detour route, and open the new path by switching from the detour path to the new path including the section, when the power supply driving circuit turns on the power supply to the section such that data transmission using the section becomes possible by turning on the power supply, wherein the power supply driving circuit is further configured to:

suppress notifying another communication device coupled to the section of a link failure occurrence, when the power supply driving circuit turns off power supply to the section and when the link failure occurred outside the section, and notify the another communication device of the link failure occurrence, when the power supply driving circuit turns off power supply to the section and when the link failure occurred in the section.

2. The communication device according to claim 1, wherein the power supply driving circuit is configured to turn off the power supply to the section when receiving, from an opposed communication device located at another edge of the section, a notification indicating that the detour routes related to all of path setting patterns including the section and the opposed communication device are obtained.

3. The communication device according to claim 1, wherein the calculation circuit is configured to:

perform recalculation for specifying another route as the detour route when a failure of the detour route occurs, and update the detour routing information based on a result of the recalculation, wherein the power supply driving circuit turns on the power supply to the section when the another route is not specified.

4. The communication device according to claim 1, wherein the calculation circuit is configured to:

perform recalculation for specifying another route as the detour route when the usable band of the detour route becomes equal to or smaller than the predetermined threshold, and update the detour routing information based on a result of the recalculation, wherein the power supply driving circuit turns on the power supply to the section when the another route is not specified.

5. A communication device, comprising:

a memory; and a processor coupled to the memory and configured to:

calculate a detour route of respective path setting patterns including a section the communication device which is located at an edge of the section;

store detour routing information including detour routes calculated by the calculation circuit;

turn off power supply to the section, when detour routes related to all of the path setting patterns are obtained;

specify a detour route bypassing the section using the detour routing information, a usable band of the detour route to be specified as being greater than a predetermined threshold, when determining that the new path includes the section;

open a detour path including the detour route and a terminal point, by transmitting the request to the terminal point using the specified detour route and receiving a response message generated at the terminal point in response to the request via the specified detour route; and open the new path by switching from the detour path to the new path including the section, when the power supply driving circuit turns on the power supply to the section such that data transmission using the section becomes possible by turning on the power supply, wherein the processor is further configured to:

suppress notifying another communication device coupled to the section of a link failure occurrence, when the processor turns off power supply to the section and when the link failure occurred outside the section, and notify the another communication device of the link failure occurrence, when the processor turns off power supply to the section and when the link failure occurred in the section.

6. A method executed by a processor included in a communication device configured to establish a path for data transmission, the method comprising:

calculating, by a calculation circuit, a detour route of respective path setting patterns including a section the communication device which is located at an edge of the section;

storing detour routing information including detour routes calculated by the calculation circuit;

turning off power supply to the section, when detour routes related to all of the path setting patterns are obtained;

receiving a request for opening a new path, the request including information on a terminal point of the new path;

specifying a detour route bypassing the section using the detour routing information, a usable band of the detour route to be specified as being greater than a predetermined threshold, when determining that the new path includes the section;

opening a detour path including the detour route and the terminal point, by transmitting the request to the terminal point using the specified detour route and receiving a response message generated at the terminal point in response to the request via the specified detour route; and opening the new path by switching from the detour path to the new path including the section, when the processor turns on the power supply to the section such that data transmission using the section becomes possible by turning on the power supply, wherein the method further comprises:

suppressing notifying another communication device coupled to the section of a link failure occurrence, when turning off power supply to the section and when the link failure occurred outside the section, and notifying the another communication device of the link failure occurrence, when turning off power supply to the section and when the link failure occurred in the section.

7. The path establishing method according to claim 6, further comprising:

turning off the power supply to the section when receiving from the another communication device making up the section along with the communication device a notification indicating detour routing information corresponding to all of the path setting patterns including the section from the another communication device.

8. The path establishing method according to claim 6, further comprising:
performing recalculation for specifying another route as the detour route when a failure of the detour route occurs;
updating the detour routing information based on a result of the recalculation; and
turning on the power supply to the section when the another route is not specified.

9. The path establishing method according to claim 6, further comprising:
performing recalculation for specifying another route as the detour route when the usable band of the detour route becomes equal to or smaller than the predetermined threshold;
updating the detour routing information based on a result of the recalculation; and
turning on the power supply to the section when the another route is not specified.

10. The communication device according to claim 1, wherein
the request includes information of nodes corresponding to a start point and a terminal point, and
the setting circuit is configured to:
calculate a shortest path from the start point to the terminal point; and
determine the shortest path as the new path.

11. The communication device according to claim 1, wherein
the setting circuit determines whether the new path to be opened includes the section by referring to the detour routing information.

12. The communication device according to claim 1, wherein
the setting circuit is configured to transfer the received request for opening the new path to a neighbor node on the new path.

13. The communication device according to claim 1, wherein the calculation circuit calculates the detour route based on a calculation condition that a particular node or link is not included in the section.

14. The communication device according to claim 1, wherein the setting circuit is configured to determine that the section has been successfully activated and the data transmission using the section becomes possible, at a time of confirming that two ports included in two nodes respectively located at a tip of the section have been restored from a failure state.

15. The communication device according to claim 1, wherein the calculation circuit is configured to:
perform recalculation for specifying another route as the detour route when a ratio between a used band and all usable bands in the detour route is equal to or greater than a predetermined threshold; and
update the detour routing information based on a result of the recalculation.

16. The communication device according to claim 1, wherein the another communication device is configured to search a shortest path to detour the section when the link failure occurred in the section is notified by the communication device.

17. The communication device according to claim 1, wherein the power supply driving circuit is configured to suppress turning off the power supply to the section, when the path setting patterns including the section and the communication device are not obtained.

18. The communication device according to claim 2, wherein the power supply driving circuit is configured to suppress turning off the power supply to the section, when the notification is not received from the opposed communication device.

19. The communication device according to claim 1, wherein the setting circuit is configured to open the new path, when a predetermined time has elapsed since the power supply driving circuit turned on the power supply to the section, the predetermined time being longer than a time for setting a hardware of an interface card included in the communication device and coupled to the section.

20. The communication device according to claim 19, wherein the setting circuit is configured to open the new path when control data indicating that an interface card included in the opposed communication device has successfully activated is received from the opposed communication device.

* * * * *